United States Patent
Covic et al.

(10) Patent No.: US 10,573,445 B2
(45) Date of Patent: Feb. 25, 2020

(54) ELECTROMAGNETIC FIELD CONFINEMENT

(71) Applicant: Auckland UniServices Limited, Grafton (NZ)

(72) Inventors: Grant Anthony Covic, Mount Albert (NZ); John Talbot Boys, Takapuna (NZ)

(73) Assignee: Auckland UniServices Limited, Auckland (NZ)

( * ) Notice: Subject to any disclaimer, the term of this patent is extended or adjusted under 35 U.S.C. 154(b) by 0 days.

(21) Appl. No.: 14/780,102

(22) PCT Filed: Mar. 27, 2014

(86) PCT No.: PCT/NZ2014/000054
§ 371 (c)(1),
(2) Date: Sep. 25, 2015

(87) PCT Pub. No.: WO2014/158034
PCT Pub. Date: Oct. 2, 2014

(65) Prior Publication Data
US 2016/0049232 A1 Feb. 18, 2016

(30) Foreign Application Priority Data

Mar. 27, 2013 (NZ) ........................................ 608759
Jul. 10, 2013 (NZ) ........................................ 613099

(51) Int. Cl.
*H01F 7/20* (2006.01)
*B32B 15/18* (2006.01)
(Continued)

(52) U.S. Cl.
CPC .............. *H01F 7/202* (2013.01); *B32B 15/18* (2013.01); *B32B 15/20* (2013.01); *H01F 27/346* (2013.01);
(Continued)

(58) Field of Classification Search
CPC ........ H01F 7/202; H01F 27/346; H01F 38/14; B32B 15/18; B32B 15/20
(Continued)

(56) References Cited

U.S. PATENT DOCUMENTS

| 3,838,356 A * | 9/1974 | Knerr | H03B 7/146 |
| | | | 330/287 |
| 4,766,401 A * | 8/1988 | Kjosness | H04B 3/28 |
| | | | 333/12 |

(Continued)

FOREIGN PATENT DOCUMENTS

| WO | WO-2011/016736 | 2/2011 |
| WO | WO-2012/018268 | 2/2012 |

(Continued)

OTHER PUBLICATIONS

"International Application No. PCT/NZ2014/000054, International Search Report and Written Opinion dated Jul. 25, 2014", (Jul. 25, 2014), 13 pgs.

*Primary Examiner* — Bernard Rojas
(74) *Attorney, Agent, or Firm* — Schwegman Lundberg & Woessner, P.A.

(57) ABSTRACT

The present subject matter relates to the control of electromagnetic fields and has particular relevance to wireless power transfer system devices and systems. In particular there is provided a magnetic flux coupling apparatus comprising a coil for generating or receiving magnetic coupling flux; and a leakage flux element separated from the coil by a region of relatively low magnetic permeability and positioned to provide a controlled path for leakage flux independent of coupling flux; wherein the leakage flux element comprises a lossy magnetic material of relatively high magnetic permeability which absorbs energy from a time varying magnetic field to thereby alternate attenuate leakage flux. The apparatus as disclosed herein aids in the suppres- (Continued)

sion of the magnetic flux that leaks out of the air gap in such systems, or which leaks out of a region where magnetic flux is required for inductive power transfer.

25 Claims, 13 Drawing Sheets

(51) Int. Cl.
    *H02J 50/70* (2016.01)
    *H02J 50/10* (2016.01)
    *H01F 38/14* (2006.01)
    *H01F 27/34* (2006.01)
    *B32B 15/20* (2006.01)
    *H01Q 17/00* (2006.01)

(52) U.S. Cl.
    CPC ........... *H01F 38/14* (2013.01); *H01Q 17/004* (2013.01); *H02J 50/10* (2016.02); *H02J 50/70* (2016.02); *B32B 2307/208* (2013.01); *B32B 2307/212* (2013.01); *B32B 2457/00* (2013.01)

(58) Field of Classification Search
    USPC .......................................... 335/296, 299, 301
    See application file for complete search history.

(56) References Cited

U.S. PATENT DOCUMENTS

| 2004/0145441 | A1* | 7/2004 | Arnett | ................ H01F 17/0006 336/200 |
|---|---|---|---|---|
| 2013/0015718 | A1 | 1/2013 | Jung et al. | |
| 2013/0293323 | A1* | 11/2013 | Nakase | ................... H01P 3/121 333/236 |

FOREIGN PATENT DOCUMENTS

| WO | WO-2012/018269 | 2/2012 |
| WO | WO-2013/036146 | 3/2013 |
| WO | WO-2014/158034 | 10/2014 |

* cited by examiner

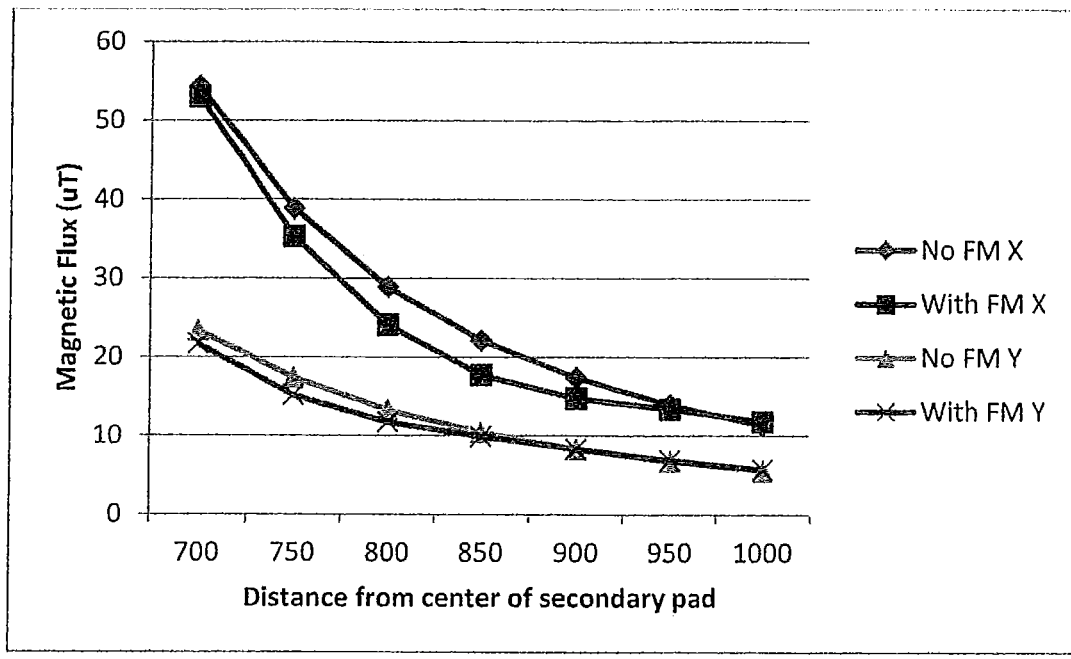
Figure 10a
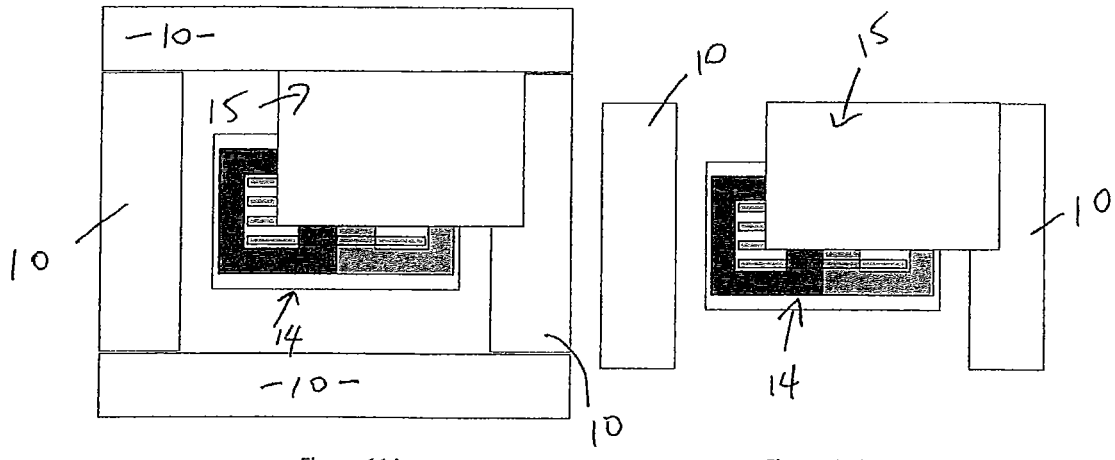
Figure 11A
Figure 11B
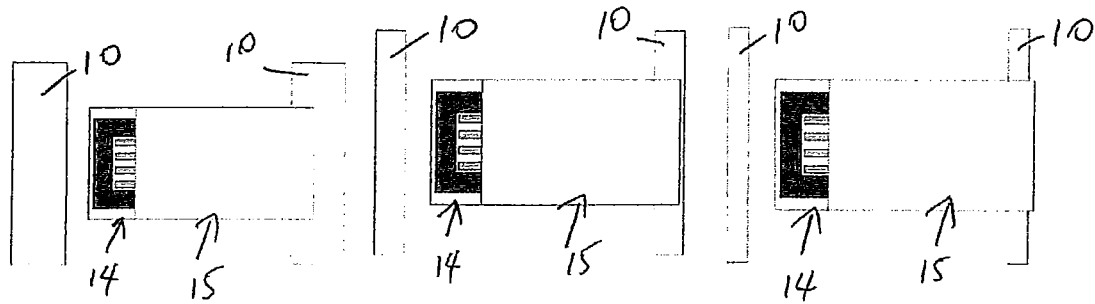
Figure 12A
Figure 12B
Figure 12C

ELECTROMAGNETIC FIELD CONFINEMENT

PRIORITY CLAIM TO RELATED APPLICATIONS

This application is a U.S. national stage application filed under 35 U.S.C. § 371 from International Application Serial No. PCT/NZ2014/000054, which was filed 27 Mar. 2014, and published as WO2014/158034 on 2 Oct. 2013, and to New Zealand Application No. 613099, filed 10 Jul. 2013, which applications and publication are incorporated by reference as if reproduced herein and made a part hereof in their entirety, and the benefit of priority of each of which is claimed herein.

FIELD OF INVENTION

The invention relates to control of electromagnetic fields. The invention has relevance to wireless power transfer system devices and systems, commonly known as inductive power transfer (IPT) devices and systems. The invention has particular relevance to magnetic flux coupling apparatus such as inductive power transfer pads for wireless power transfer systems.

BACKGROUND

A problem of considerable concern in some IPT Systems, such as IPT roadway applications, is suppressing the magnetic flux that leaks out of the air gap in such systems, or which leaks out of a region where magnetic flux is required for inductive power transfer. This problem exists for charging and powering of stationary and moving systems, whether they are high or low power systems. Examples include: low power electronic devices such as cell phones, tablet computers, notebook computers computer peripherals, lighting; higher power devices such as domestic appliances, robots, automatically guided vehicles, as electric vehicles (EVs), industrial equipment.

The problem can be described using the example of a system which enables EV wireless charging from a roadway. In such a system the roadway includes a flux coupler which can be energised by a power supply to provide a time varying magnetic flux. A corresponding flux coupler on the vehicle allows the vehicle to be wirelessly (inductively) coupled to the power supply. There is an air gap between the flux coupling structures. The air gap may vary and be relatively very large and there may be considerable misalignment between the roadway flux coupler and the flux coupler on the vehicle. Magnetic flux which is not present in an appropriate region for coupling (referred to herein as coupling flux) is unwanted and is referred to herein as leakage flux. Leakage flux may escape from the gap between the flux coupling structures and interfere with other objects or systems. In this example the allowable leakage flux is required to be maintained at a very low level despite the relatively large amounts of power being transferred from the power supply to the vehicle.

The actual flux density allowed in the immediate vicinity of the vehicle may be 17 µT which may be compared with the earth's magnetic field of approximately 60 µT, the major difference being that the earth's field is a constant DC field while the IPT system will have an alternating field at a frequency between 10 and 140 kHz.

It is an object of the invention to reduce magnetic field that leaks out of a region where magnetic flux is required for inductive power transfer, such as the air gap in IPT systems.

SUMMARY OF THE INVENTION

In one aspect the invention provides a magnetic flux coupling apparatus comprising:
a coil for generating or receiving magnetic coupling flux; and
a leakage flux element comprising material of a relatively high magnetic permeability;
wherein the leakage flux element is separated from the coil by a region of relatively low magnetic permeability and positioned to provide a controlled path for leakage flux independent of coupling flux.

The region of relatively low magnetic permeability comprises a space between the coil and the leakage flux element, but may alternatively comprise another material.

The leakage element may be constructed or positioned to substantially prevent magnetic saturation in use. It is also located, constructed or positioned to provide a path to return leakage flux to the coil. The leakage flux element may also comprise a plurality of discrete pieces of material having a relatively high magnetic permeability. The pieces of material may be joined together, or may be placed adjacent to each other.

In one embodiment, the leakage flux element substantially surrounds a perimeter of the coil or coils. In another embodiment it is substantially associated with only one or more (for example one or two) sides of the apparatus or coil.

The magnetic flux coupling apparatus may include a magnetically permeable member which is magnetically associated with the coil to facilitate generating or receiving coupling flux.

The leakage flux element may be formed of material that absorbs energy from a time varying magnetic field. In one embodiment the leakage flux element may be formed of a material having hysteresis so that magnetic flux in the leakage flux element loses energy. Preferably the material has at least one of a high coercivity or a high retentivity.

In one embodiment the leakage flux element may extend between regions where leakage flux occurs and/or can be arranged to intercept leakage paths for flux in the environment in which the apparatus is located. Preferably the leakage flux element is relatively non-conductive. It may also be flexible.

In another aspect the invention provides an electromagnetic wave absorber comprising:
a high permeability magnetic material arranged in a first layer; and
a conductive or low permeability material arranged in a second layer.

The electromagnetic wave absorber may further comprise a high permeability magnetic material arranged in a third layer; and wherein the conductive or low permeability layer is arranged is an intermediate layer between the first and third layers.

Preferably at least one of the first or second high permeability layers absorb energy from a time varying magnetic field. The first and second high permeability layers may have a different permeability. At least one of the high permeability layers may have a volume or thickness sufficient to prevent the layer becoming magnetically saturated in use. The low permeability layer may have a thickness less than the order of the skin depth for a required absorption frequency.

In one embodiment the one or more of the high permeability layers comprise multiple component-layers of high permeability material separated by non-metallic, non-magnetic material. The number of component-layers is adapted to prevent magnetic saturation for a given flux. Also, the number of component-layers is adapted such that at least one of the high-permeability layers provide a required attenuation for magnetic flux.

Any one or more of the layers may comprise a tortuous path to facilitate energy dissipation In one embodiment materials in consecutive layers have large differences in their relative conductances and reluctances so as to contain electrical or magnetic fields in respective layers.

The invention also provides an electromagnetic wave absorber comprising a plurality of layers of a ferrimagnetic or ferromagnetic material alternated with a plurality of layers of conductive or low permeability material.

In another aspect the invention broadly provides a magnetic flux coupling apparatus comprising:
a coil for generating or receiving magnetic coupling flux;
a leakage flux element comprising material of a relatively high magnetic permeability; and
wherein the leakage flux element is separated from the coil by a region of relatively low magnetic permeability such that leakage flux produced by the coil is substantially confined to the leakage flux element.

In one embodiment the region of relatively low magnetic permeability comprises a space between the coil and the leakage flux element.

In one embodiment the leakage flux element substantially surrounds the coil.

In one embodiment the leakage flux element comprises a plurality of discrete pieces of material having a relatively high magnetic permeability. The pieces of material may be joined together, or may be placed adjacent to each other.

In one embodiment the magnetic flux coupling apparatus includes a magnetically permeable member which is magnetically associated with the coil to facilitate generating or receiving coupling flux.

Aspects of the present invention concentrate leakage flux, which leaks from the working area and/or the high permeability core of an IPT coupling device or pad, within a leakage element which is formed of high permeability material and which defines a path for the leakage flux whereby leakage flux in a region outside that path is reduced.

The leakage component may be formed of material that is highly coercive so the flux in the leakage element loses energy.

The leakage element may extend between regions where leakage flux occurs and/or can be arranged to intercept leakage paths for flux through the environment around the pad Aspects of the present invention provide a means for concentrating flux in two or more paths of high-permeability separated by a region of relative low permeability to separate magnetic flux in said two paths. One path may be arranged to provide a return path for coupling flux in an IPT pad so as to enhance performance of the IPT pad and another path may be arranged to provide a controlled path for leakage flux leaking from the IPT pad so as to reduce leakage flux beside the controlled path.

Aspects of the invention may provide a first high-permeability pathway for flux within an IPT pad and a second high-permeability pathway for flux leaking from the IPT pad, wherein the second high-permeability pathway may extend relative to the pad so as to intercept leakage flux and channel leakage flux away from regions located relative to the pad. This interception and channelling reduces leakage flux in these regions.

In another aspect the invention broadly provides a magnetic flux coupling apparatus comprising:
a coil for generating or receiving coupling flux;
a magnetically permeable core magnetically associated with the coil, and;
a leakage element formed of a magnetically permeable material, the leakage element being spaced from the core and providing a path for leakage flux produced by the coil to be returned to the core.

In one embodiment the leakage element is separated from the core by a region of relatively low permeability.

Preferably the magnetic permeability of the leakage element is comparable to, or greater than, that of the core.

Preferably the leakage element comprises an amorphous metal. The leakage element may comprise one or more layers of a sheet material.

In another aspect the invention broadly provides a magnetic flux coupling apparatus comprising:
a coil for generating or receiving coupling flux;
a leakage element formed of a highly magnetically permeable sheet material, the leakage element providing a path for leakage flux.

The apparatus may include a magnetically permeable core which provides a path for coupling flux produced or received by the apparatus.

The magnetic permeability of the leakage element may be comparable to, or greater than, that of the core.

The leakage element may be separated from the core by a region of relatively low permeability.

In another aspect the invention broadly provides a magnetic flux coupling apparatus comprising:
a coil for generating or receiving coupling flux;
a leakage element formed of a magnetically permeable sheet material, the leakage element providing a path for leakage flux and:
wherein the leakage element including one or more areas or relatively high magnetic reluctance.

In another aspect, the invention provides a backing for one or more IPT coils, the backing comprising:
a first high-permeability element formed of high-permeability material;
a second high-permeability element formed of high-permeability material; and
a low-permeability element formed of conductive or low permeability material and arranged between the first and second high-permeability elements.

The second high-permeability layer may extend beyond the low-permeability element and the first high-permeability layer in one or more directions.

The second high permeability element may comprise one or more layers or sheets of material.

The low permeability element may comprise one or more layers or sheets of material.

The first high-permeability layer may be suitable to provide a flux concentrator for an IPT system having one or more coils.

The first high-permeability element may be a ferromagnetic or ferri-magnetic material.

The second high-permeability element may be a ferromagnetic or ferri-magnetic material.

A high-permeability layer may have permeability substantially higher than air. A high-permeability layer may have permeability suitable to substantially concentrate flux within the layer whereby flux about the layer is reduced.

The second high-permeability element may in use be distal from coils to be backed relative to the first high-permeability layer.

The second high-permeability layer may exhibit coercively which is higher than that of the first high-permeability layer. The second high-permeability layer may have coercively such that the second high permeability layer attenuates flux concentrated within.

The second high-permeability layer may have permeability higher than that of the first high-permeability layer.

The second high-permeability layer may comprise multiple component-layers of high permeability material separated by non-metallic, non-magnetic material. The number of layers may be such that the second high-permeability layer does not saturate for a given flux or such that the second high-permeability layer provides optimal attenuation for flux.

One or more of the elements above may comprise one or more sheets of material.

In another aspect, the invention provides a compound backing element for one or more IPT coils, the backing element comprising ferrimagnetic or ferromagnetic material arranged in a first high-permeability layers, ferromagnetic or ferrimagnetic material arranged in a second high-permeability layer and conductive material arranged in a conductive layer between the first and second high-permeability layers.

In another aspect, the invention provides a compound backing element for one or more IPT coils, the backing element comprising ferrimagnetic or ferromagnetic material arranged as a first high-permeability element, ferromagnetic or ferrimagnetic material arranged as a second high-permeability layer and arranged in a low permeability layer arranged between the first and second high-permeability layers.

In another aspect the invention provides an inductive power transfer pad suitable when energised to cause flux in an active region so as to energise a second pad in the active region, the pad comprising one or more first-high-permeability elements to cause flux to be concentrated in the active region relative to flux outside the active region, the pad further comprising one or more a second-high-permeability elements arranged to cause flux leaking from the active region to be concentrated in a path which avoids one or more regions defined relative to the pad.

The two layers may be separated by a conductive layer to arrange a low-permeability or conductive region or layer between the first and second high-permeability layers. The low-permeability layer may be sufficiently low to substantially prevent any flux loops generated by the pad extending through both the first and second high-permeability layer.

The second high-permeability elements may be arranged to provide a high permeability path between two or more leakage regions outside the active region so that flux loops passing through the two or more leakage regions tend to concentrate in the high permeability path between the regions.

Embodiments of the invention may comprise an IPT pad or backing for an IPT pad for either a primary or secondary pad in an IPT system.

Embodiments of the invention may comprise a primary or secondary pad having features as defined in one or more of the paragraphs above.

Embodiments of the invention may comprise a system comprising a primary and secondary pad as defined in one or more of the paragraphs above.

Another aspect the invention provides an IPT pad having one or more first-high-permeability-elements to concentrate flux so as to enhance flux in an active region of the pad, a plate to which the elongate elements are mounted, wherein the plate is conductive or has low permeability and one or more second-high-permeability-elements located on an opposite side of the plate from the elongate elements. The one or more first-high-permeability elements may comprise ferrite bars. The one or more second permeability elements may comprise a sheet of amorphous metal.

Another aspect of the present invention comprises one or more layers of ferro magnetic or ferri magnetic material and one or more layers of conductive material. The one of more layers of conductive material may have a thickness which is greater than a skin effect depth for the material. The one of more layers of conductive material may have a thickness which is substantially equal to a skin effect depth for the material. The one of more layers of conductive material may have a thickness which is less than a skin effect depth for the material.

The one or more conductive layers may be thin enough that flux is not reflected by the conductive layer. The one or more conductive layers may be thin enough that flux passes through the conductive layer.

The one or more Ferro-magnetic or Ferri-magnetic materials may comprise amorphous metals.

The invention also comprises methods of providing magnetic coupling structures or arrangements, and methods of providing electromagnetic wave absorbers.

Further aspects will become apparent from the following description.

BRIEF DESCRIPTION OF THE DRAWINGS

Embodiments of the invention will be described with reference to the drawings in which:

FIGS. 4(a,b and c) are simulations of the magnetic field about two coupled pad structures:
  (a) without any leakage flux control;
  (b) with a single layer leakage flux element above the upper pad; and
  (c) with a triple layer leakage flux element above the upper pad, and a triple layer leakage flux element below the lower pad.

The shaded regions show approximate areas of magnetic field strength above certain thresholds.

Figure 5:
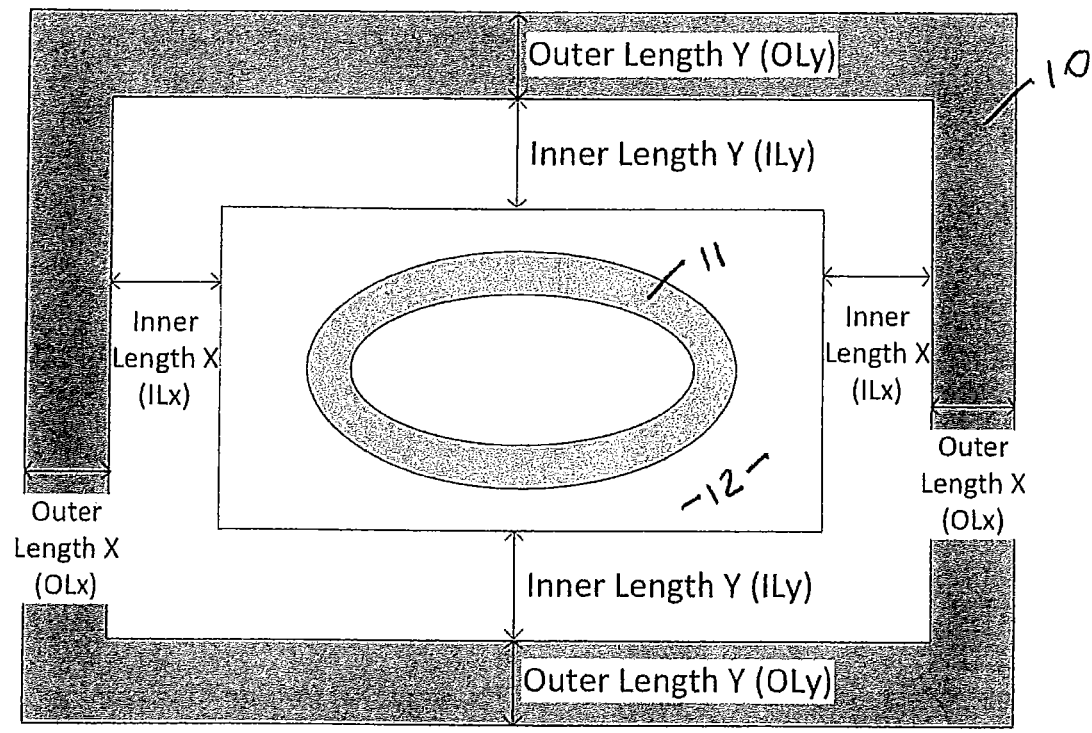

FIG. 5 is an embodiment of an IPT system where the leakage element is spaced from the coil.

Figure 6:
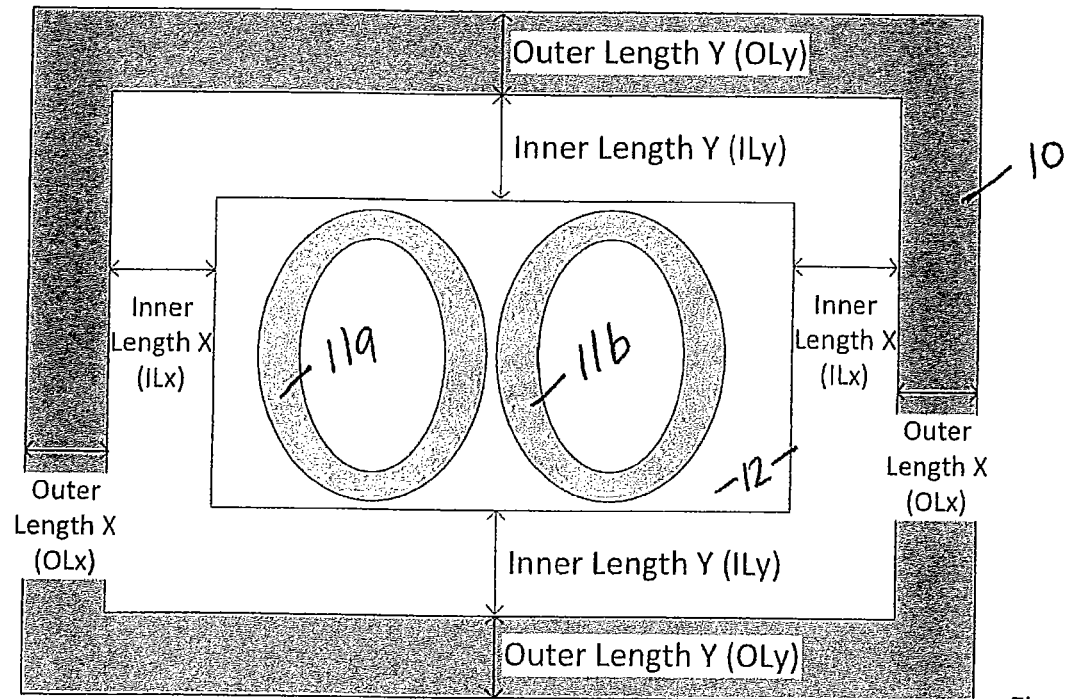

FIG. 6 is an embodiment of an IPT system where the leakage element is spaced from a double coil.

Figure 7:
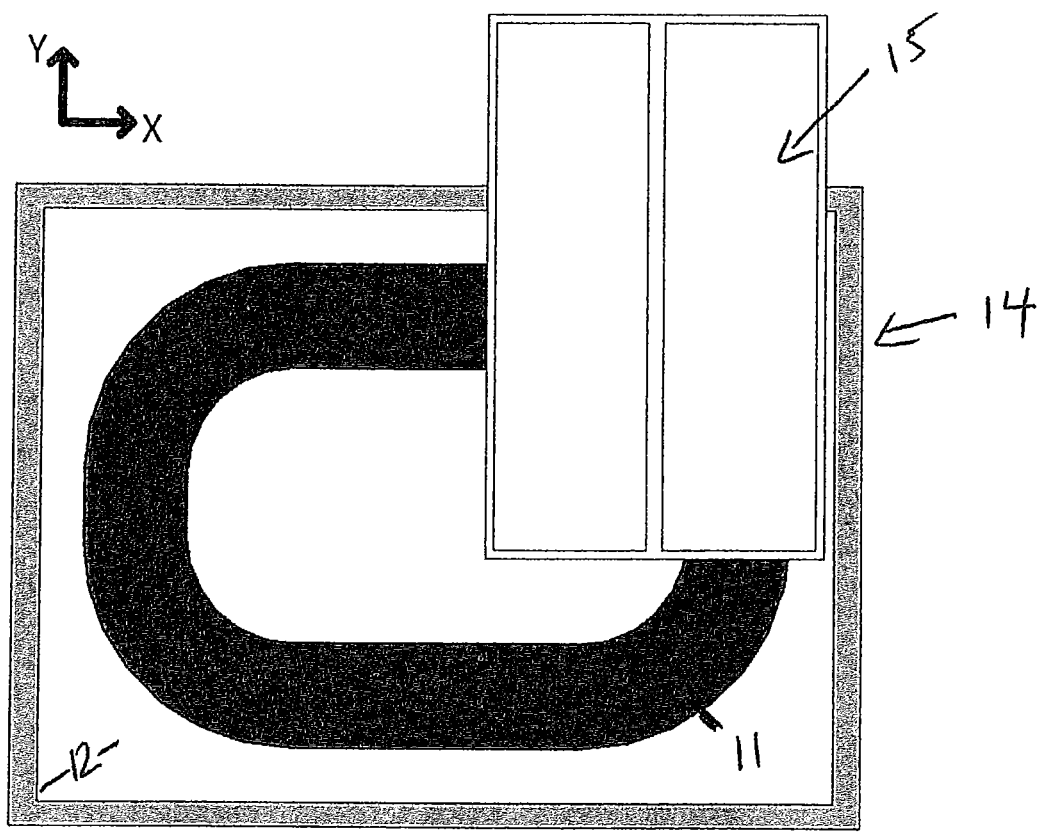

FIG. 7 is an embodiment of an IPT system where the leakage element is spaced from a primary coil and a secondary coil is positioned nearby.

Figure 7A:
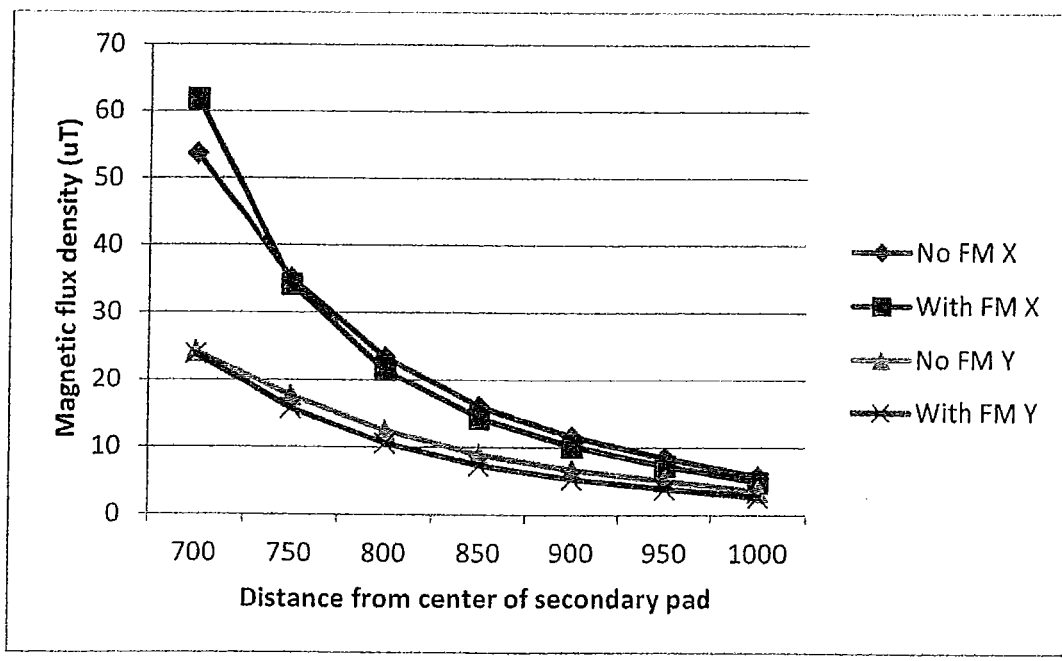
Figure 7B:
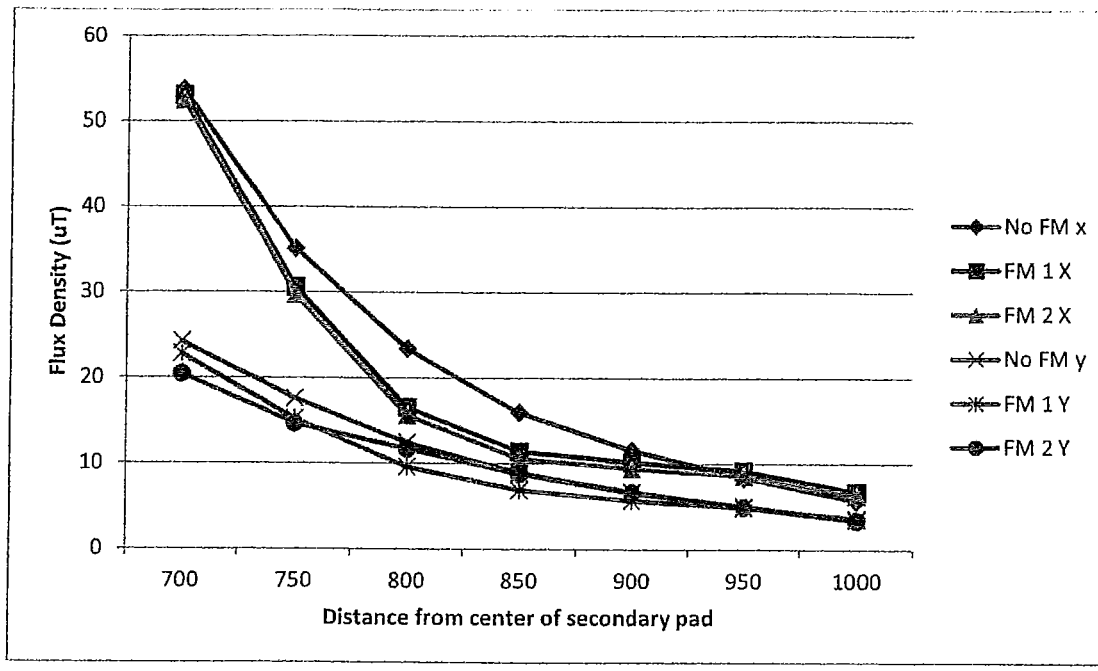

FIG. 7(a) shows flux readings along the centre of the secondary pad of FIG. 7 in the X and Y axes for systems with and without leakage elements FIG. 7(b) shows flux readings along the centre of the primary pad of FIG. 7 in the X and Y axes without and with two variations of leakage elements.

Figure 8:
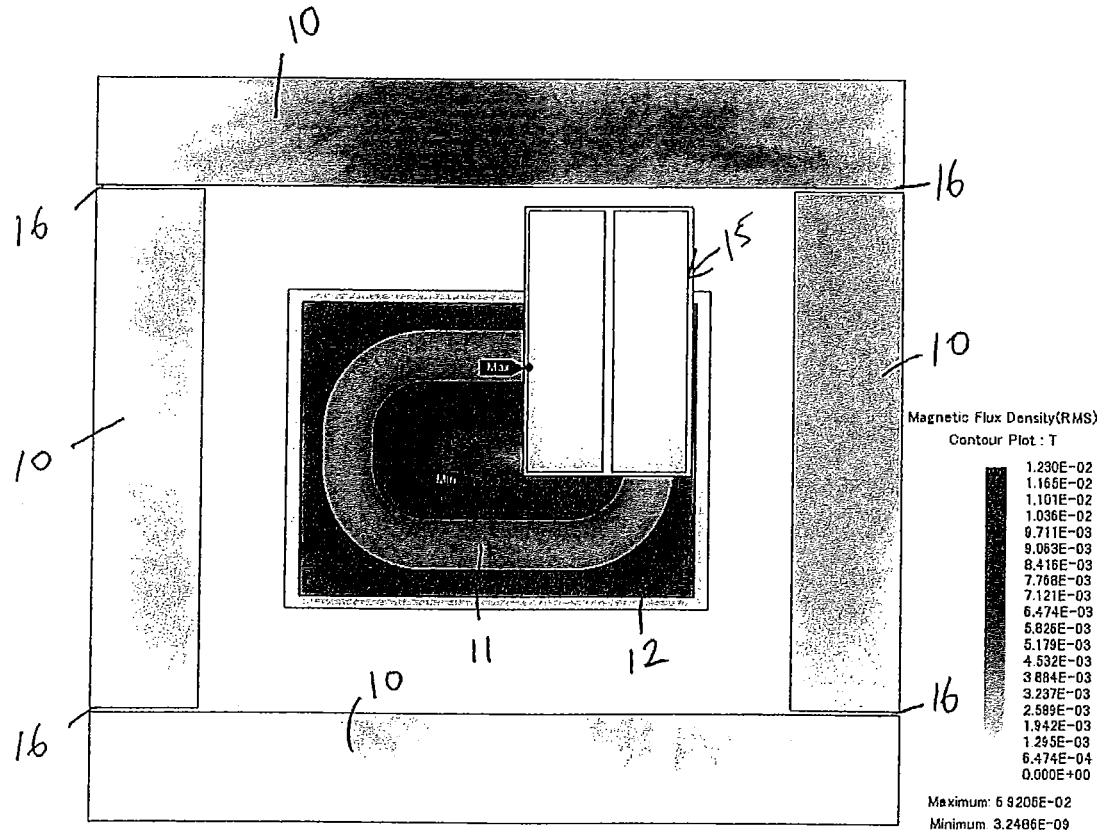

FIG. 8 shows an embodiment having a leakage element constructed from a plurality of sections.

Figure 9:
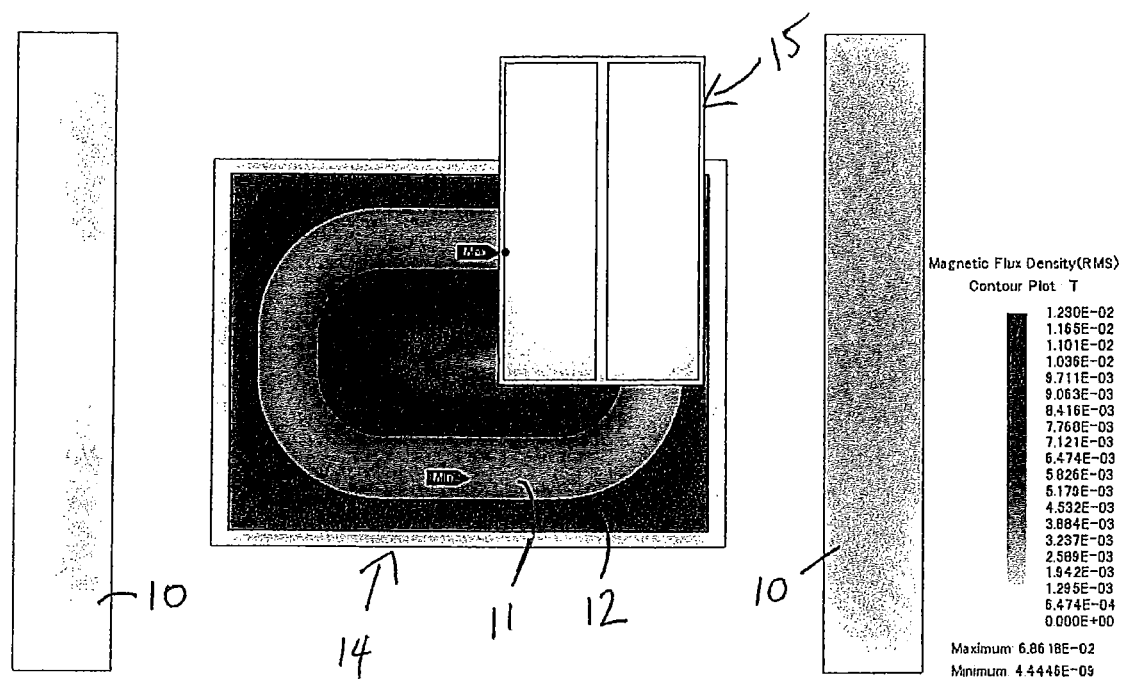

FIG. 9 shows an embodiment having leakage reactance on two sides of the primary pad.

Figure 10:
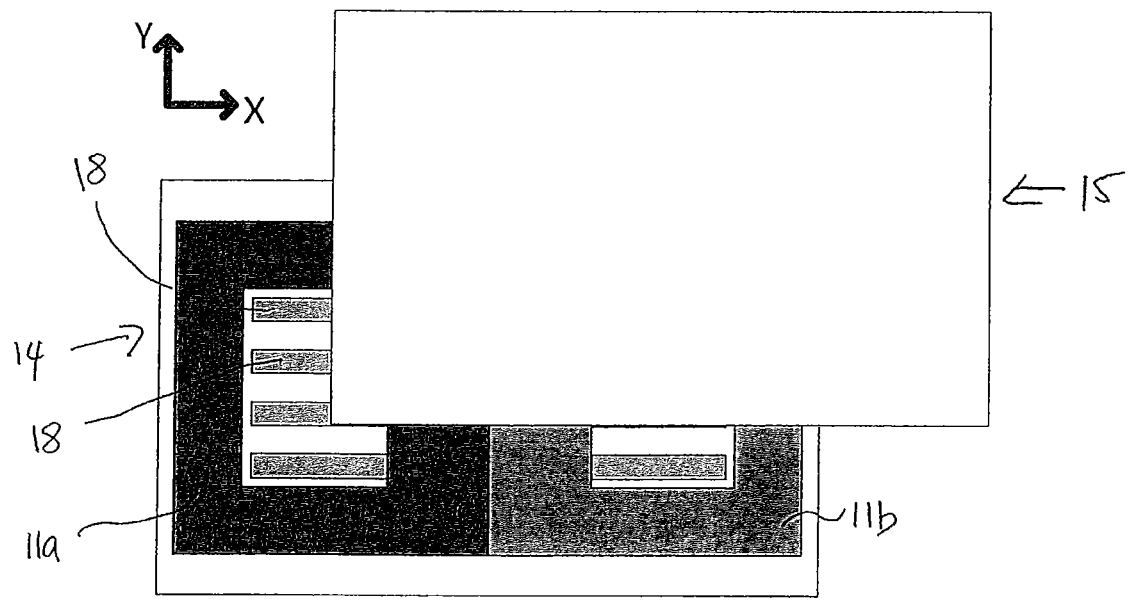

FIG. 10 shows an embodiment of a DD-DDQ pad having a permeable core.

FIG. 10(a) shows flux readings along the centre of the primary pad of FIG. 10 in the X and Y axes with and without leakage elements.

FIG. 11(a) shows an embodiment having a leakage element constructed from a plurality of sections.

FIG. 11(b) shows an embodiment having a leakage element constructed from a plurality of sections on two sides of the pad.

Figure 12D:
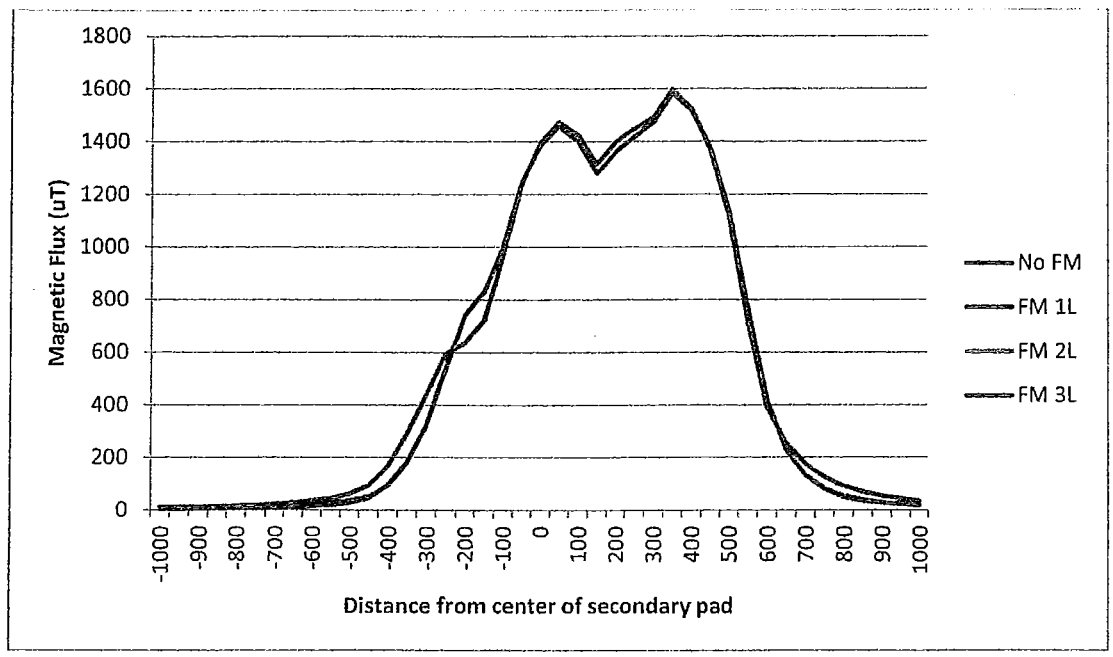
Figure 12E:
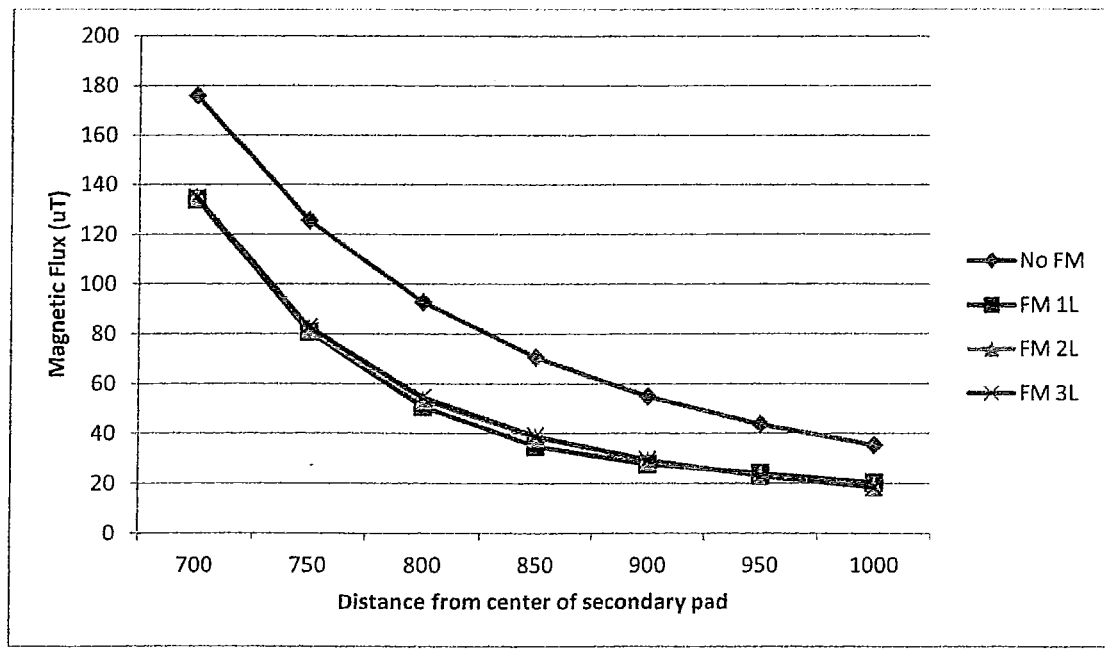

FIGS. 12(a,b and c) show embodiments with a variety of shapes of leakage elements FIGS. 12(d and e) shows flux readings along the centre of the primary pad of FIG. 12 in the X axes with and without leakage elements.

Figure 13:
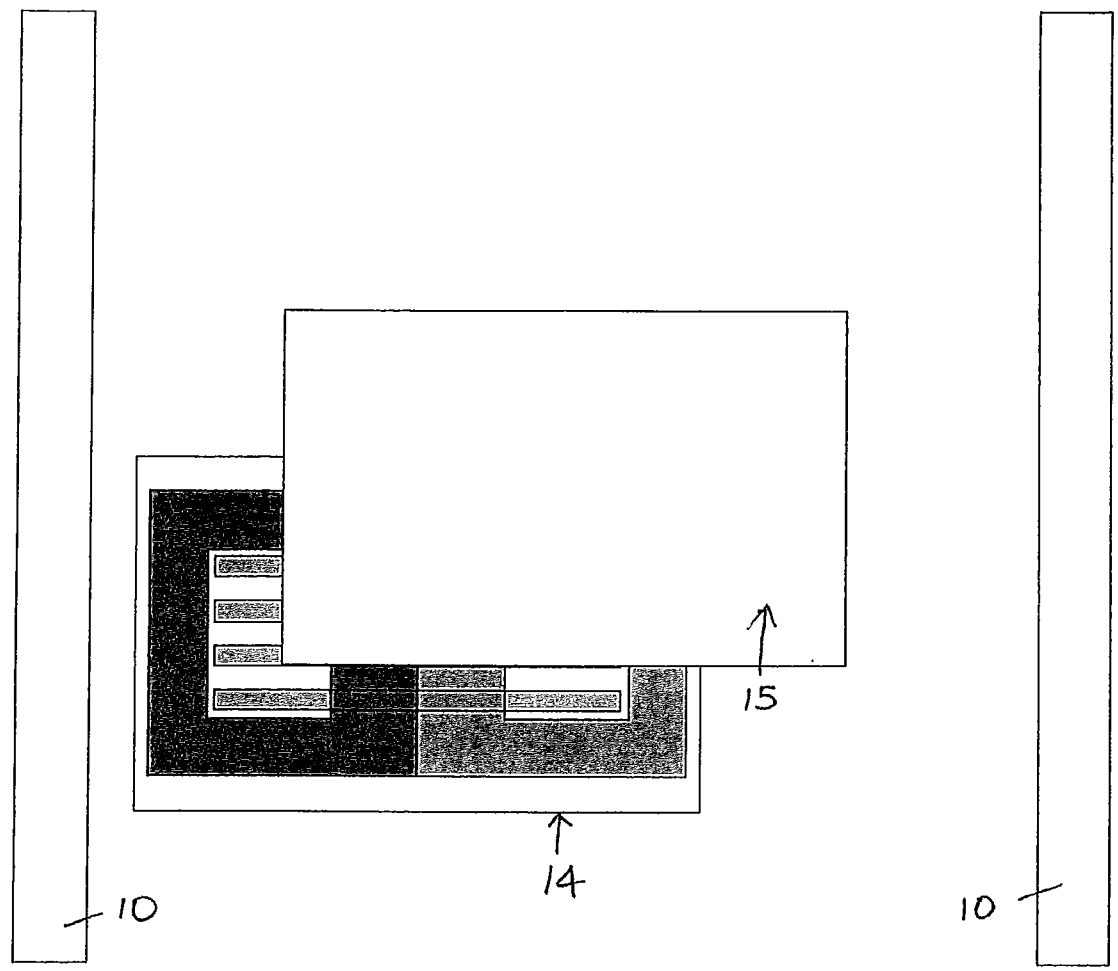

FIG. 13 shows an embodiment having leakage elements on the edges of a vehicle.

FIGS. 14(a and b) show embodiments of layered material structures in cross-section.

DETAILED DESCRIPTION OF EMBODIMENTS OF THE INVENTION

The embodiments described below primarily relate to applications of the invention for vehicular wireless power transfer which is but one example of a possible application of the invention. Those skilled in the art will appreciate that the invention is also applicable to other inductive power transfer applications including for example without limitation: low power electronic devices such as cell phones, tablet computers, notebook computers, computer peripherals, lighting; higher power devices such as domestic appliances, robots, automatically guided vehicles, as electric vehicles (EVs), industrial equipment. It will also be appreciated that the invention finds application to control or shaping of electromagnetic fields in a more general sense. Thus the invention includes within its scope devices which guide, channel or absorb electromagnetic fields: for example electromagnetic wave absorbers which absorb, dissipate or guide electromagnetic energy such as that emitted by mobile electronic devices including cell phones and computers.

As described above, in an IPT roadway system power transfer is facilitated by a magnetic field that couples both the roadway ("primary") and the on-vehicle ("secondary") magnetic flux coupling apparatus. Such flux coupling apparatus is conveniently (although not necessarily) provided in the form of a primary pad and a secondary pad, and is referred to herein using the term "pad". Such systems may be bi-directional, in which case the primary pad becomes that present on the vehicle, and the secondary becomes the pad which is associated with the roadway. A description of an IPT roadway system is provided in published International Application WO 2011/016736 the disclosure of which is incorporated herein by reference.

The flux coupling apparatus used in these systems may take a variety of different forms. In the generation of the magnetic field which produces the coupling flux that transfers power other fields local to the primary or the secondary are also produced. These do not transfer power but they do fill their immediate vicinity with magnetic flux that must be restrained so that objects, including people, in that immediate vicinity are not affected by that flux. Screening techniques for magnetic flux are well known and suitable materials for this include copper, aluminium, other metals, ferrite, other ferri- and ferro-magnetic materials, and the like. These materials all have screening abilities to a greater or lesser amount. In general copper and other electrically conductive materials tend to reflect the flux back to where it came from with a change in sign such that there is a cancellation at the metal surface. Ferrites and other magnetically permeable materials tend to reflect the flux without the change in sign.

Figure 1:
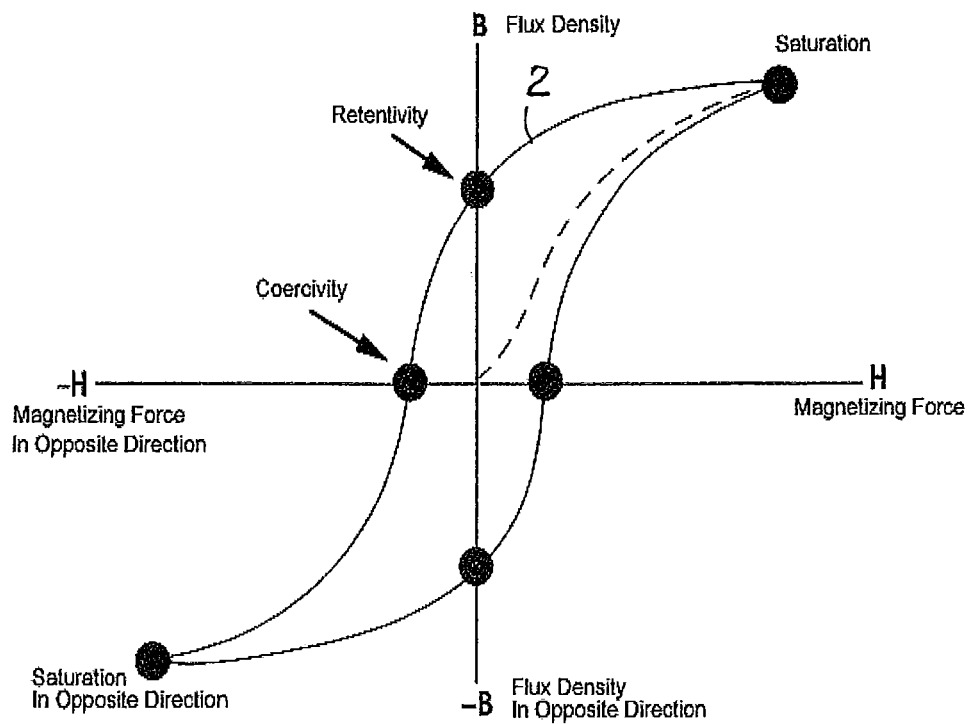
FIG. 1 is a classical hysteresis loop for a ferromagnetic material.

Referring to FIG. 1, properties of magnetic materials are commonly observable using a magnetic hysteresis loop where an AC magnetic field intensity (H) is used to produce a magnetic flux density (B) in a material and the resultant flux density is plotted against the magnetic field intensity in what is known as a hysteresis loop for the material. The energy loss in the material is proportional to the area 2 bounded by the loop. Low loss materials typically correspond to hysteresis loops that are very thin (i.e. low coercivity); high loss materials typically have hysteresis loops that are significantly fatter (i.e. high coercivity). It will also be seen that the area bounded by a hysteresis loop will be increased, all other things being equal, by if the loop intersects the B axis further from the origin i.e. if the retentivity or residual magnetism of the material is higher. Therefore, greater loss will occur in materials that have greater coercivity and/or retentivity.

The loop can retain its non-linear shape and still be low loss. At high flux densities the material will saturate and this saturation phenomenon is observable with magnetic material where the relative permeability is larger than 1.

Figure 2:
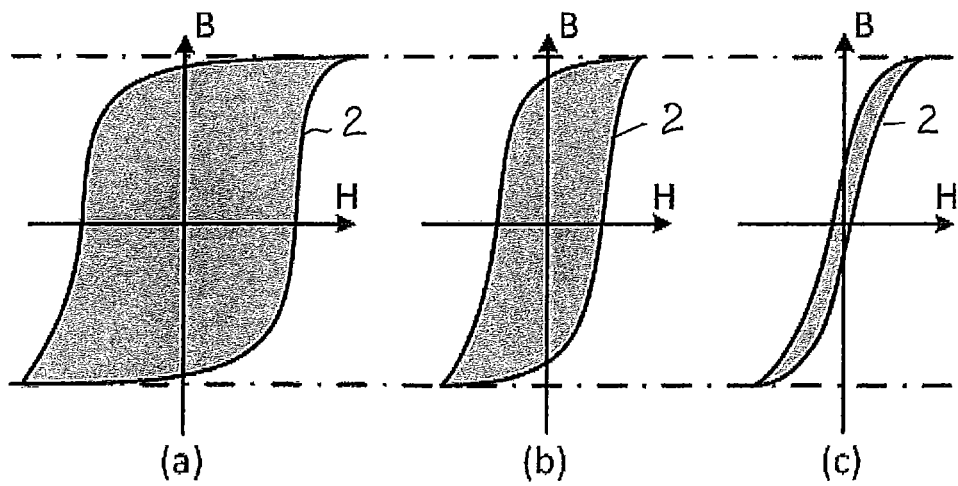
FIGS. 2(a)-(c) are hysteresis loops for different materials with the same saturation flux level.

Variations in hysteresis loops can be seen in FIGS. 2(a)-(c). Referring to those Figures, all of these materials have the same saturation flux density but the loop on the left (FIG. 2(a)) loses a lot more energy than the loop on the right (FIG. 2(c)) for each cycle experienced by the material.

Ideally, material would be used to screen flux from regions around the pad where it is required that field levels are low, perhaps as specified by a standard.

In many circumstances a magnetic material cannot be used as a screen as the flux density is too high, or the temperature is above the Curie point and all the magnetic properties of the material are lost. In these circumstances only metal/conductor screening is possible and such screening must work on a "flux-frightening" principle, which the reader will understand as reflecting flux. In the case of magnetic pads high temperatures are to be avoided so the use of magnetic material is really essential.

Referring to FIG. 3(a), two coupled flux coupling devices are shown diagrammatically as pads 4, 5. Each pad includes a coil, and the coil of one of the pads is energised to produce a magnetic field represented in the Figure by lines 3 of coupling flux which enables power transfer between the pads, and lines 6 representing leakage flux. Each pad 4, 5 itself provides a return path for the coupling flux 3. Leakage flux 6 from both pads 4 and 5 propagates completely around each pad.

Figure 3:
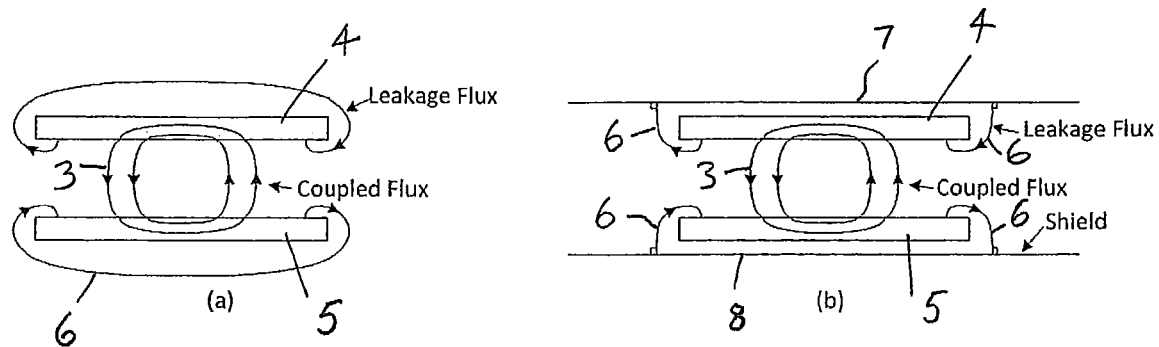
FIG. 3(a) is a diagram of two coupled IPT pads in side elevation.
FIG. 3(b) is a diagram of two coupled IPT pads including leakage flux control or screening in side elevation.

However if a highly permeable leakage flux element 7, 8 is in place, as shown in FIG. 3(b,) then the leakage flux 6 will go through the element 7, 8 rather than through the air or other material, such as concrete surrounding the pad. A highly permeable element, such as ferrite, may be provided separately in the pad itself to provide a return path for the coupling flux 3. FIG. 3(b) shows the highly permeable leakage flux elements 7, 8 each provided in the form of a sheet of material extending beyond edges of the respective pad so the leakage flux encounters the highly magnetically permeable regions provided by the elements 7, 8. In this way the leakage flux from each pad is guided or steered into the region occupied by each leakage flux element. This allows the location of the leakage flux to be controlled by providing a controlled path for the leakage flux. Each leakage flux element also allows the path and thus the location of the leakage flux to be controlled separately or independently from the coupling flux. Thus the leakage flux can be substantially confined to the region occupied by the leakage flux element(s) as opposed to other regions in the vicinity of one or both pads.

Although two coupled pads are shown in FIG. 3(b), the reader will understand that if there is a single energised (i.e. uncoupled) pad, say pad 5 for example, then the associated leakage flux element 8, will still assist with controlling the leakage flux while the coupling flux remains available in the region above the pad for power transfer when required. The leakage flux element can be positioned in a variety of ways to allow it to steer or guide the leakage flux to provide the controlled path independently of the coupling flux i.e. without substantially affecting the coupling flux.

It will be seen in FIG. 3(b) that the leakage flux element 7 is spaced from pad 4 and element 8 is spaced from pad 5 providing a separation region of low relative permeability. This region of low relative permeability separates the path of coupling flux (which may include a separate high permeability element such as a ferrite core within the pad) from the low reluctance (high permeability) path provided to control the leakage flux. This separation is selected depending on the magnetic structure and requirements of the pad and the system, so that the leakage flux element does not provide a path for coupling flux. The spacing of the separation can also be selected to prevent the leakage flux element from saturating. Moreover, the dimensions and material from which the leakage flux element is constructed may also be selected to prevent the leakage flux element from saturating.

The leakage flux element 7 should be formed of material that is a non-conductor so that it operates by attracting flux to it and not by reflecting it away. As mentioned above, two separate high permeability pathways are used—one for the coupling flux and one for the leakage flux. In one embodiment of the invention these pathways may be separated by a metallic conductor. In these circumstances if one of the highly permeable pathways is slightly conductive the effect will be swamped by this metallic separator. For example, an amorphous metal could be used in the path for the leakage flux element. An amorphous metal component such as METGLAS may have a resistivity of $1.2 \cdot 10^{-6}$ Ohms.m while aluminium has a resistivity of $2.7 \cdot 10^{-8}$ Ohms.m which is 44 times smaller so the conductivity of the METGLAS component can safely be ignored in the presence of a metallic aluminium separator.

Thus the material for the screen 7 should be highly permeable to guide, steer, or attract the magnetic leakage flux to go through it. In some embodiments to may be desirable that the leakage flux element 7, 8 should be lossy so that energy in that leakage flux may be absorbed. The element 7, 8 may be provided by a layer of amorphous metal, or suitable alternative material with high permeability (and optionally with high coercivity and/or retentivity). In the example of a roadway IPT system, the leakage element may be located around or operably adjacent to a roadway pad (along its under-side) and above the in-vehicle pad to prevent flux propagating into the passenger compartment of the vehicle.

If an amorphous metal is used it should be as thin as possible yet it should not saturate or its effectiveness will be lost. Power loss in magnetic materials can be mathematically added by giving the material a complex permeability. A low permeability may be associated with a relative permeability ($\mu_r$) of approximately 1. For instance common materials such as air, Wood, aluminium and concrete have a permeability of approximately 1. A high permeability material may be associated with a relative permeability of 2, 5 10 or more. For instance Ferrite may have a relative permeability of 16-640. It is noted that permeability measurements are known to vary, particularly at high field strengths and frequency.

The effect of power loss in a magnetic material can be seen quite clearly using a material with a 'square' hysteresis loop as in the loop of FIG. 2(a). If a magnetic core is made from a square hysteresis loop the top right hand corner of the loop corresponds to the peak energy in the magnetic material.

$$\text{Peak\_Energy} = \frac{1}{2}\hat{B}\hat{H}$$

The energy lost each cycle of the loop is (approximately) $4\hat{B}\hat{H}$

The energy loss per radian is therefore $$4\hat{B}\hat{H}\frac{f}{\omega}$$

So that the magnetic Q is given by $$Q = \frac{\text{Peak\_energy\_stored}}{\text{Energy\_loss\_per\_radian}} = \frac{\pi}{4} \quad (1)$$

Similarly for an inductor using the same Q definition $$Q = \frac{\omega L}{R}$$

If the hysteresis loop for the material is not quite so 'square' the Q may be higher but in this application a low Q is preferred and corresponds to materials with 'square' hysteresis loops.

Analysis of an AC Circuit with a Magnetic Material in it

In a practical AC circuit the component inductance is $$L = \frac{\mu A N^2}{l} \quad (2)$$

where the symbols have their usual meaning.

The VAR load is $I^2 \omega L$

For this simple AC inductive circuit $$V = IR + j\omega LI \text{ and } \frac{\omega L}{R} = Q \quad (3)$$

Here for a single component where the permeability is complex $\mu = \mu_1 - j\mu'$ say $$L = \frac{\mu_1 A N^2}{l} - j\frac{\mu' A N^2}{l} \quad (4)$$

For this component alone in a circuit the reactance and equivalent resistance may be found from the circuit impedance using (4)

$$j\omega L = j\frac{\mu_1 A N^2 \omega}{l} + \frac{\mu' A N^2 \omega}{l} \quad (5)$$

The first term is the expected inductive reactance, and the second is a resistance.

The circuit Q is given by the inductive reactance divided by the resistance:

$$Q = \frac{\mu_1}{\mu'} = \frac{\pi}{4}$$

Thus for a square hysteresis loop a value for the complex part of the permeability is $$\mu' = \frac{4\mu}{\pi}$$

For amorphous metal the permeability may be in the order of 70,000, so µ' at 100 kHZ is approximately $$\frac{280,000}{\pi} = 89,000$$

This is the value needed in a simulator to estimate the performance of amorphous metal in this application.

Materials that are useful for applications involving embodiments of this invention are sheet metal, amorphous metal, amorphous (powdered) cobalt, METGLAS and alloys such as permalloy and supermalloy. One example is the material sold under the trade mark FINEMET. These materials vary widely in their physical characteristics and cost. Some materials are very hard and brittle—for example ferrite. The most traditional materials for screening purposes are probably copper and permalloy—which can have a relative permeability greater than 100,000. Amorphous cobalt can also have very high permeability as too can METGLAS and amorphous metal. Ideal materials are flexible, easy to use and low cost.

Roadway pads are difficult to screen as it is not possible to have screens completely around the coupled pads. This is a major problem quite unlike other screening problems as the on-vehicle pad must be movable and screens cannot impede that movement. Here the individual pads have to be 'semi-enclosed' to achieve as much screening as possible. Conceptually the situation is shown in FIGS. 3(a) and 3(b) with pad 4 being the vehicle mounted pad, and pad 5 being the pad mounted on the ground or in the roadway. As noted the air-gap between the pads cannot be screened without changing the clearance under the vehicle—which is not acceptable. The semi-screening shown here is more and more effective as the leakage flux element screens are extended further from the centre line but again there is a limit to how large these screens can be. The flux is guided or attracted into the leakage flux element screens (at right angles for high permeability material) and propagates from one end of the pad to the other thus providing a pathway for leakage flux which prevents the leakage flux from interfering with other objects.

Roadway pads for inductive powering of electric vehicles come in different shapes and sizes but arguably the "Double D" pads are the best available from the viewpoint of power transfer across wide air gaps. Such pads include two side-by-side flat coils and are described in International Publication WO 2012/018268 the contents of which are incorporated herein by reference.

However these wide air gaps are also worse from a leakage point of view and allow considerable flux out the sides of the pad. The leakage flux tends to connect one end of a pad to the other end and a pathway already exists for this flux through the ferrite structure of the pad(s) on which the coils are located. An aluminium layer is provided on the side of the ferrite opposite to that of the coils to assist with the structural integrity of the pads. Some flux does circulate around behind the pad structure on the outside of the aluminium: the flux is small but is still a problem as the allowable level is so low.

The leakage flux element 7, 8 shown in FIG. 3(b) is located externally of the aluminium of the respective pad and can be employed to reduce the leakage flux by confining the leakage flux to the element 7, 8 so that any leakage flux beyond the leakage flux element is eliminated or at least reduced. The aluminium, being a conductor, can also function as a flux shield on the face of a pad opposite that to which the coupled field is to be produced. Surprisingly it is advantageous to keep the aluminium there for its structural role, and to mount a layer of highly permeable material such as amorphous metal to provide the leakage flux element so as to guide and constrain and thus regulate the circumnavigating leakage flux.

Even though the leakage flux is small and it is barely affected by the aluminium under normal circumstances such effects as it has are beneficial. This is an unexpected result. Without the amorphous metal layer the flux in the aluminium is very small and has a negligible effect. But when the aluminium is replaced with amorphous metal the field is distorted and significant flux goes through the amorphous metal and reduces the power transfer capability of the pick-up system since it provides another pathway for the coupling flux. So when amorphous metal is used it is advantageous for the aluminium, or a material having similar field reflecting and/or low permeability properties, to also be in place or the power output of the pad will be reduced. The reader will understand that the aluminium layer is performing a role of a low-permeability layer or region which has permeability low enough to prevent flux which would ideally be concentrated within a ferrite of a pad from passing through the amorphous metal for example in sufficient levels to cause a noticeable drop in the output power of the pad.

If amorphous metal is used for this screen it may be modified from its original form. Typically amorphous metal is only about 18 microns thick and is fragile, but flexible. It has a relative permeability that can be very high-typically 70,000 and a maximum flux density that can be very high—1.0-1.3 T. However if the amorphous metal is buried in a plastic cover giving a total thickness of 1.8 mm then the material can be used as though its maximum flux density is 13 mT and its relative permeability is 700. A material of this thickness is easily cut and shaped and is more practical in most applications. Where a larger cross section of amorphous metal is needed (extra screening layers) these 1.8 mm sheets can be simply stacked up and the amorphous metal will share the flux between the layers as the actual amorphous metal sheets are in fact separated by 1.8 mm.

Figure 4:
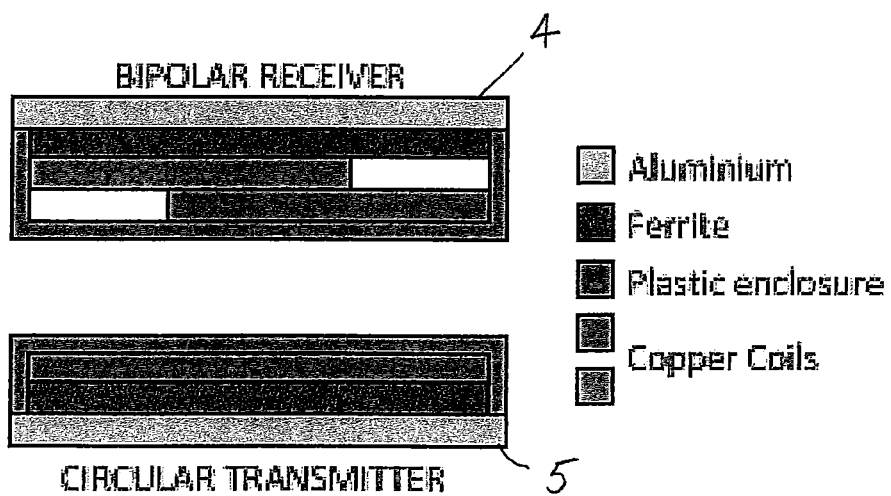
FIG. 4 is a diagram in cross section of two IPT pads.

A cross section of a "circular" pad coupled with a "Bipolar" pad is shown in FIG. 4 to show the versatility of the amorphous metal screening approach. The circular pad has a simple generally circular coil underneath which lies a permeable material such as ferrite. A backing plate of a conductor such as aluminium may be provided, and the upper parts of the pad may be covered for protective purposes, using a plastic cover for example. Bipolar pads are described in International publication WO 2012/018269 the contents of which are incorporated herein by reference. The pad construction for these pads is essentially the same as the construction of a DD pad in so far as starting at the outside of the pad there is a layer of aluminium, a thin layer of plastic as a cushion for the ferrite (not shown), a layer of ferrite, a layer of one or more copper windings, and a tough plastic enclosure. (In principle, because of symmetry, circular pads need less screening than non-circular pads but when misalignment is present circular pads can radiate significantly.) Similarly for a DD pad starting at the air-gap there is a tough protecting plastic enclosure up to 10 mm thick. After this there is a layer of windings of litz wire 4 mm thick, followed by a layer of ferrite 16 mm thick, a layer of cushioning plastic 1-2 mm thick, and an aluminium backing plate 2-6 mm thick. In the circular pad, the bipolar pad, and the DD pad Amorphous metal in its 2 mm thick form goes outside the aluminium plate (i.e. on the side furthest from the coils) and may be more than one layer, and both the amorphous metal and the aluminium may extend beyond the normal size of the pad. In a vehicular application, the screening problem is to reduce the unwanted flux at the perimeter of the vehicle to less than 17 uT. The unwanted flux is measured in the middle of the airgap, 800 mm from the centre line of the pad which is the centre line of the vehicle and corresponds to a vehicle of width 1.6 m. The flux is also measured at the top of the in-vehicle pad as this corresponds to the inside of the vehicle and this flux must be less than 6.24 uT.

A screening layer may also be used on or in parts of the enclosure to confine leakage first. One embodiment of the invention has a pad with a set of longitudinal ferrites or a striated ferrite element, provided for IPT coils to allow a return path through the pad for coupling flux to allow a return path through the pad for coupling flux, which run from one end of an elongate pad to another. The ferrites are mounted on a piece of metal, such as aluminium, which screens a side of the pad opposite the coils and also locates the ferrites with respect to each other. In some embodiments the ferrites sit in indentations in the metal. A sheet of highly permeable material such as amorphous metal is mounted on the metal sheet opposite the ferrites and extends beyond the ends of the pad. The screen may be thought of extending into leakage regions outside the working region of the pad, which might be defined as a region which another, primary or secondary, pad would be located in use. Leakage flux which would otherwise extend in a loop around the screen encounters the sheet of highly permeable material extending beyond the screen. The path defined by the sheet of highly permeable material represents a section of a low reluctance loop for the leakage flux so the flux follows that path. The path is substantially flat against, or close to, the screen so leakage flux is reduced behind the pad.

The sheet of highly permeable material could be thought as directing flux from one leakage region to another.

Other embodiments have ferrites, screens and sheets, or other suitably shaped elements, to direct flux between leakage regions of circular or alternative shaped pads. Adaptions to the shape of the sheet will be apparent to the reader, but might involve a circular screen with a circular sheet of highly permeable material having a greater diameter than the screen.

Leakage fields are generally flux lines (fields) outside the region where primary and secondary pads of an IPT system interact to transfer power. Of particular concern in some applications are leakage fields that pass around the back of the pad, such as the loops above and below the IPT system shown in FIG. 3(a).

Figure 14A:
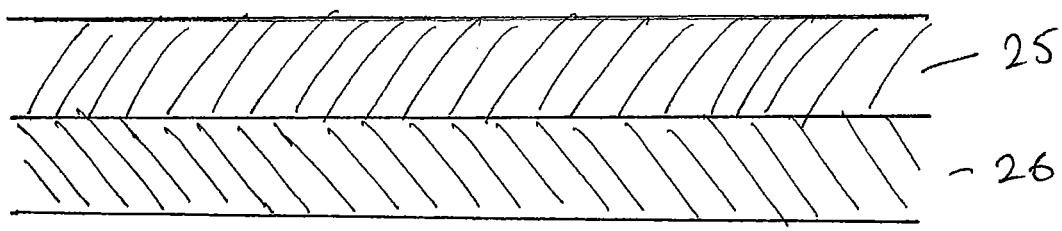
Figure 14B:
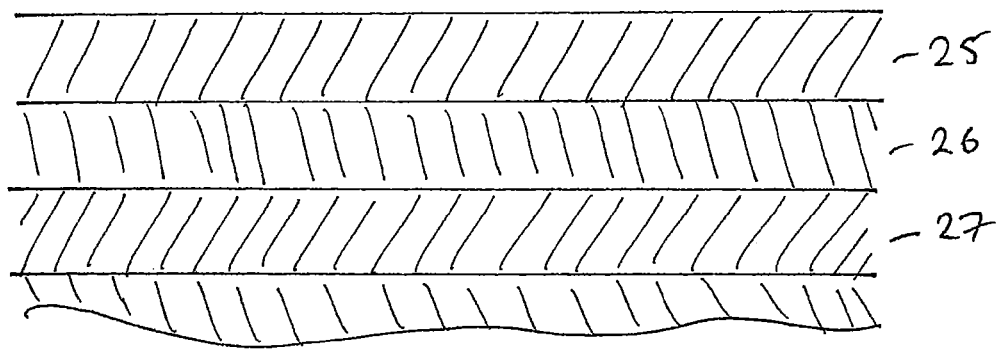

Electromagnetic fields more generally can also be controlled or absorbed using amorphous metal, or any high permeability, or high permeability and lossy material, 25 together with a low permeability material 26 such as a conductor (or other metallic material) in combinations of alternating layers as shown in FIGS. 14a and 14b. For example in a 'sandwich' of a first layer comprising high permeability material 25 and a second layer comprising a conductor 26, a magnetic field on one side of the sandwich will primarily go through the high permeability layer but as it propagates through that layer it produces an electric field that preferentially propagates in the next layer in the sandwich—the conductor. Because of the unique relationships between magnetic fields and electric fields if a magnetic field propagates through the high permeability metal layer in the x direction, this will cause a current in an adjoining layer of aluminium in the y direction. Then if a third layer of high permeability material 27 is provided next to the conductive layer, a field will be present in this third layer in the x direction. A fourth layer of low permeability or conductive material may be added, and so on. In one embodiment, these layers are very thin but the currents and fields will be substantially contained within them because the relative conductances and reluctances are thousands of times different in one layer to the adjoining next layer. And as current goes through the, or each, conductive layer it produces a loss in power, and a field in the permeable material produces a loss in power so that the original field is attenuated.

In one embodiment, the permeable material for one or more layers may comprise an amorphous metal which can be suitably lossy to provide the required attenuation. In some embodiments the conductor for the low permeability layer can be aluminium foil or netting.

In actual laboratory measurements a magnetic field above a circular coil measured 62 microtesla 300 mm above the coil. With a layer of amorphous metal between the coil and the measurement point the measured flux dropped to 29 microtesla. Adding another layer of aluminium after the amorphous metal caused the flux to drop to 2 microtesla, which is a very surprising result. Moreover the Aluminium in this embodiment does not shield the amorphous glass and prevent it from applying loss to the flux. When the layers were reversed the field above a single layer of foil was 9 microtesla. Adding a layer of amorphous metal reduced the field to 5 microtesla. More layers will produce more attenuation but aluminium is hundreds of times lower cost than amorphous metal so keeping the best sequence for the layers is desirable.

In other embodiments the amorphous metal and Aluminium are replaced with other high permeability, lossy material and other conductive materials.

In other embodiments the aluminium is replaced with another conduction material.

In some embodiments the aluminium or conductive layer is thinner than and/or approaches a skin effect depth i.e. the skin depth. In other embodiments it is substantially thicker so that flux does not pass through the layer and can pass between conductive layers.

In some embodiments there is only one layer of amorphous metal and one/or one layer of conductor.

In some embodiments such as shown in FIG. 3(b) a thin layer of highly permeable and highly coercive and/or retentive material is positioned behind the ferrite of a pad, on the opposite side of the ferrite to the coils, to direct leakage fields on a closed path from one end of the pad to the other. The sheet comprises a leakage flux element which defines a low reluctance pathway for the leakage flux loop. In effect it confines or constrains the leakage flux lines as illustrated in FIG. 3(b) by the flux line now following a straight line defined by the sheet and not extending out behind the sheet. In some embodiments the sheet is formed of material with a high coercivity. This causes the field in the sheet to lose energy. So the sheet can be thought of as providing a field directing, or concentrating, and field attenuating effect. In some embodiments, similar to that shown in FIG. 3, the sheet is arranged to form a path between regions that are near two opposite magnetic poles. In some embodiments the sheet provides a path between any two regions between which flux lines will pass to direct the flux lines in a defined path and, in some embodiments, to lose energy. By nature of the flux lines following the path defined by the sheet, flux lines can be confined to a region or excluded from a region.

In some embodiments the sheet may be replaced with a high permeability component or element of any shape and cross-section suitable to define a path for flux line confinement.

Some embodiments may have elements with greater cross-section, particularly where this is required to avoid saturation of the material in the element. The cross-section may have a number of sheets selected for the leakage field strength. More layers may be used where the leakage field strength would otherwise saturate fewer layers. The layers may be separated by sheets, or layers, of non-magnetic and not conductive, or metallic, materials.

In some embodiments a conductive sheet is placed between the high permeability elements used to direct leakage flux and a ferrite of the IPT pad. In some of these embodiments a pad may have two or more high-permeability layers, such as the ferrite to direct flux to enhance magnetic energy in the gap between two pads and a high permeability layer to direct leakage flux. In some embodiments the high permeability layers may both be ferrite, although it is anticipated that the layer to direct leakage flux would preferably be formed of a highly coercive and/or retentive material. Some embodiments may have a conductive, or at least low permeability material, layer between the two high permeability layers to act to separate the layers and prevent flux lines crossing between them. This would otherwise cause the high coercivity material to cause energy loss in coupling flux which should instead be concentrated or directed to enhance energy in the gap between the pads.

Some embodiments use the conductive later to mount ferrite bars or striated ferrite of a pad and to mount a sheet of the material to direct leakage flux.

Some of these embodiments may have any suitable formed components or elements to perform the functions described herein.

In some embodiments the high permeability layer or elements may be formed into a tortuous path. This may be desirable to enhance energy loss in leakage flux confined by the layer or elements or concentrated in them.

Various embodiments direct leakage flux between regions outside the gap between various regions around an IPT pad or outside the gap between the pads. These regions may be at the end of elongate pads or at the sides of square pads or opposite sides of a circumferential region around a pad, such as a round pad. Therefore, sheets, components or elements of some embodiments may be simply shaped similarly to the outline of a pad.

The gap between the pads will be recognised by the reader as an active or working region of an IPT pad or IPT system.

In some embodiments the leakage element may extend between two regions of differing magnetic potential to provide a highly permeable pathway between the regions so that flux will tend to follow the leakage element.

Figure 4A:
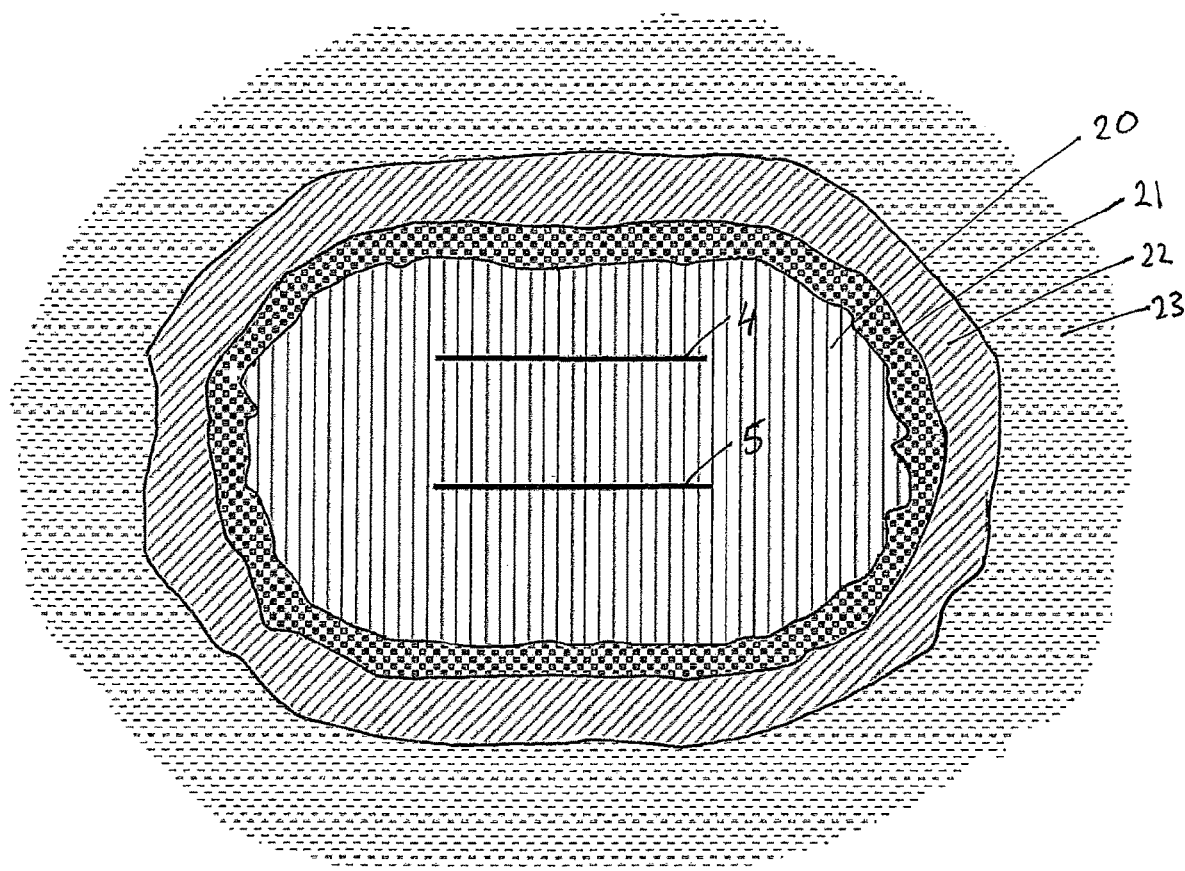
Figure 4B:
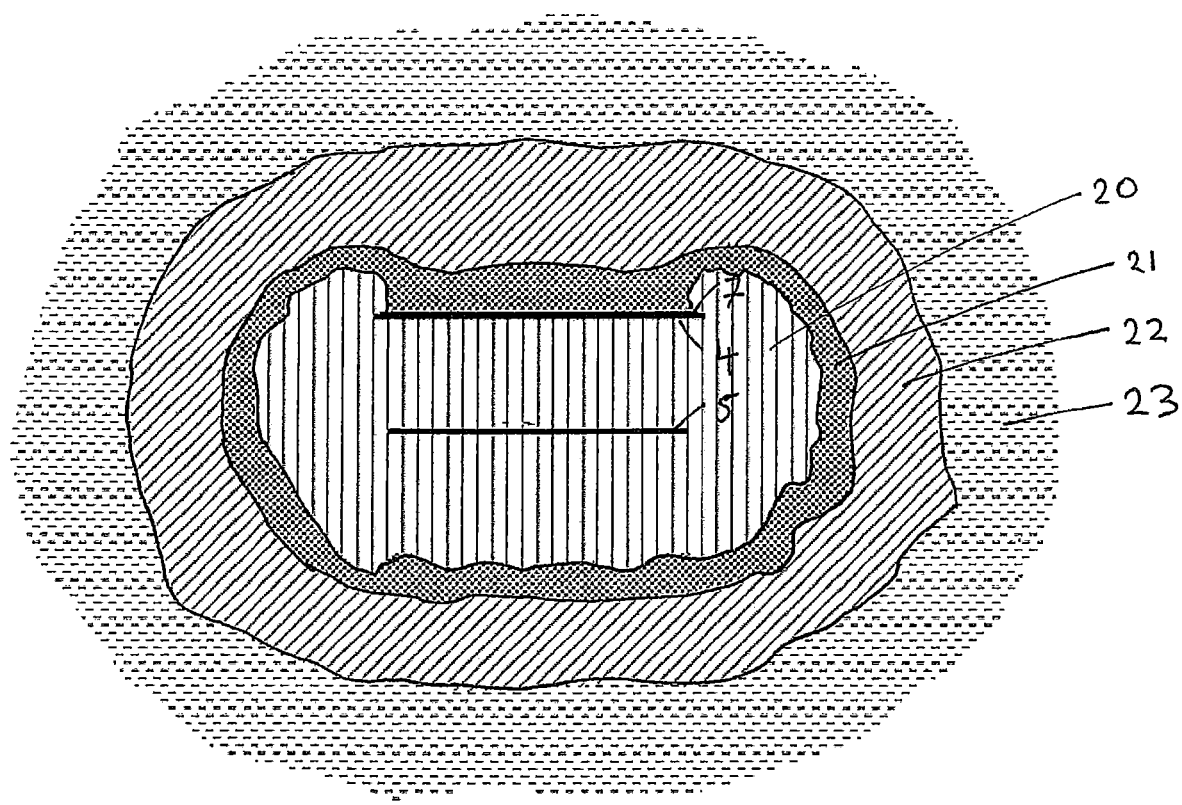
Figure 4C:
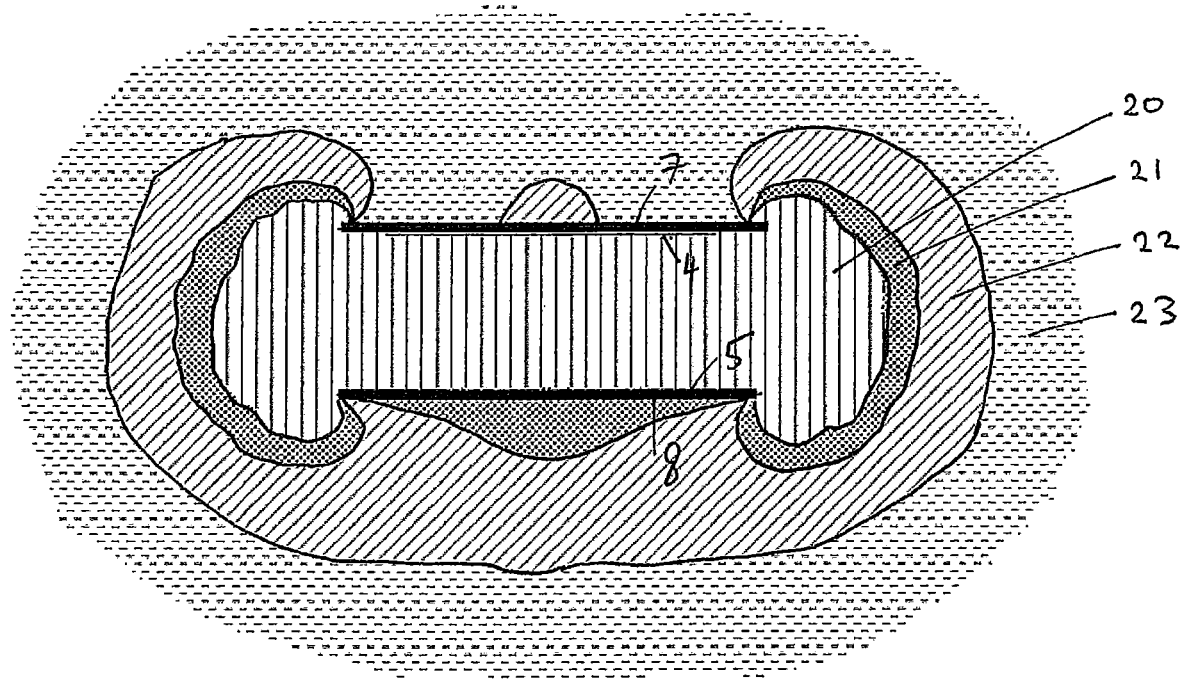

FIG. 4(a)-(c) are simulations showing coupled pads in cross-section. The pads 4, 5 are separated by a distance of 137 mm (i.e. an air gap of 137 mm), with the lower pad being energised by a power supply. The simulations use amorphous metal from one particular manufacturer but similar product is available from a variety of sources. Here it is encased in 2 mm of plastic to give a leakage flux element that comprises layer of screening material with a relative permeability of 700 and a maximum saturation flux level of 13 mT. No attempt has been made to optimize any of these results. For example the pad thickness can be reduced at each end by tapering or otherwise directing the leakage flux screen elements towards the air-gaps but this has not been done here even though it is clear that there are benefits in doing it. The region shaded in vertical lines 20 in the simulations corresponds to a magnetic field of more than 16 uT and is the border line for acceptability in some applications such as a roadway IPT system. The regions shaded in check 21, diagonal line 22 and dash 23 show regions with decreasing magnetic strength respectively. These simulations have been done without complex permeability. The simulation shown in FIG. 4(a) has no leakage flux element. In FIG. 4(b) a leakage flux element in the form of a single layer of the plastic encased amorphous metal is provided above the upper pad. The element is referenced 7 to be consistent with FIG. 3(b). In FIG. 4(c) leakage flux component 7 is provided above pad 4, the component comprising three single layers of plastic encased amorphous metal. Still referring to FIG. 4, leakage flux component 8 is provided below pad 5, the component comprising three single layers of plastic encased amorphous metal. It can be seen that the leakage flux elements effectively confine and constrain the leakage flux. More or fewer layers of amorphous metal material can be used, as required.

Non-Sheet Structures

As indicated above, sheet or layer-type material produced using the substance marketed under the trade mark FINEMET provides one embodiment for reducing the leakage fields for IPT pads.

Simulations have been compared with real life measurements and were found to be reasonably accurate. However the FINEMET designs described above are not optimised and used more than a square meter of material. Further embodiments which use less material while focusing on absorbing or controlling only the leakage flux are now described.

Referring to FIG. 5 an embodiment is shown in which a leakage element 10 is spaced from a coil 11 and backplate 12 of a pad-type flux coupling structure. The backplate 12 may comprise a permeable material that provides a path for coupling flux produced by, or received by, the pad.

Leakage Flux Surround for Circular Pads

In one embodiment, the inner dimensions (ILx and ILy) are in the range of 150-200mm. The outer length (OLx and OLy) are adjusted to provide the ideal or required amount of leakage confinement or reduction. We have found that in one embodiment OLx and OLy being approximately 150 mm-200 mm provides good leakage flux reduction.

Leakage Flux Surround for DD/DDQ Pads

Turning now to FIG. 6, an embodiment is shown for pads that have two or more coils (11a and 11b), such as Double D (DD or DDQ) pads. As mentioned above, these pad structures are described in International Publication WO 2012/018268. For DD or DDQ pads the inner length X (OLx) of element 10 which is in the direction of the poles preferably small relative to the inner length Y (ILY). Values ranging from 50 mm-100 mm are suitable for ILx and about 200 mm for ILy. The outer length (OLx and OLy) are adjusted to provide the ideal amount of leakage reduction. We have found that 200 mm-250 mm for the OLx and OLy seems to provide good leakage reduction.

Another embodiment is shown in FIG. 7. Simulations were run with a 1500 mm×1500 mm×6 mm aluminium sheet centered above the secondary pad 15 and a 1500 mm×1500 mm×1 mm Copper sheet centered below the primary pad 14. Both of these sheets are placed 10 mm away from the pads to make space for the leakage element 10 and any washers required to attach the pad to an abject such as a vehicle for example. In FIG. 7 and most of the subsequent drawing figures these aluminium and copper sheets will not be shown for clarity.

In the FIG. 7 embodiment the leakage element 10 is designed to go on both the primary and secondary sides. Both these designs will be discussed further below. The x and y axes are defined as shown in FIG. 7. The outer dimensions of the primary pad 14 are 780 mm×585 mm and outer dimensions of the secondary pad 15 are 311 mm×495 mm.

The leakage element 10 for the secondary side was validated at 200 mm displacement in both the X and Y axes. The outer dimensions of the leakage element are 1310 mm×1194 mm and "hole" dimensions are 811×695 mm (corresponds to OLx=OLy=250, ILx=200 and ILy=100 with reference to the FIG. 5 dimensions). The area of the leakage element 10 used is one square meter. The flux readings along the center of the secondary pad in both the X and Y axes are shown in FIG. 7a and FIG. 7b.

The results are summarised in table 1:

TABLE 1

| | Flux at 800 mm - No FM | Flux at 800 mm - With FM | % Decrease |
|---|---|---|---|
| X Axis | 23.4 uT | 21.4 uT | 8.48% |
| Y Axis | 12.5 uT | 10.6 uT | 15.25% |

Two leakage element designs are proposed for the element 10 of primary pad 14.

The first design (FM1) has the following dimensions:
OLx=200 ILx=150 OLy=200 ILy=250

The second design (FM2) has the following dimensions:
OLx=200 ILx=150 OLy=100 ILy=250

The flux readings along the center of the secondary pad in both the X and Y axes are shown in the graph above. The results of the flux readings at 800mm are summarised in Table 2.

TABLE 2

| | No FM | FM1 | % Decrease | FM2 | % Decrease |
|---|---|---|---|---|---|
| X Axis | 23.4 uT | 16.6 uT | 29.02% | 15.7 uT | 33.07% |
| Y Axis | 12.5 uT | 9.61 uT | 22.89% | 11.7 uT | 6.02% |

In one embodiment cuts are present in the leakage element 10 so that several pieces can be put together in the shape of the picture frame. The designs are based on a design which has the dimensions of: OLx=200, ILx=155, OLy=200,ILy=190. This has leakage reduction of 26.3% in the X axis compared to not having the leakage element and 20.4% in the Y axis.

Referring to FIG. 8, an embodiment is shown having a leakage element 10 constructed from four pieces with four 5mm cuts. Each cut is referenced 16 in the Figure.

The flux leakages with this design can are summarised Table 3.

TABLE 3

| | No FM | Plain Picture Frame | With FM Piece shown above |
|---|---|---|---|
| X Line | 23.4 uT | 17.3 uT (26.34% Decrease) | 16.3 uT (30.4% Decrease) |
| Y Line | 12.5 uT | 9.92 uT (20.37% Decrease) | 9.31 uT (25.28% Decrease) |

A two piece design was also investigated since the Y axis leakages can be considered to be not as important since it will be covered by the front and back of a vehicle for example. This design suggests that the leakage elements 10 may comprise two "strips" which can be placed beside the primary and they will take care of all the leakage fluxes. An example is shown in FIG. 9.

Thus in some embodiments the leakage element 10 does not need to surround the coil or core. In some embodiments a piece or strip of permeable material may comprise the leakage element, the piece of material being located near or proximate to a selected region in which leakage flux is to be removed or reduced.

The flux leakages at 800 mm from the center of the secondary pad with the FIG. 9 design are summarised in Table 4.

TABLE 4

| | No FM | With FM Piece shown above |
|---|---|---|
| X Line | 23.4 uT | 15.9 uT (32.1% Decrease) |
| Y Line | 12.5 uT | 11.8 uT (5.32% Decrease) |

As it can be seen—since there is no leakage element in the Y direction, the leakages have barely been reduced in the Y axis, but significant reductions have been made in the X axis. The results of the simulations discussed above seem reduce the leakage flux by significant amounts. It is noteworthy that the leakage element 10 works well in these situations since it is not getting saturated by the coupling flux. The leakage element will not operate as well if the coupling (i.e. main) flux goes through it. With all the simulations presented above, the uncompensated power has changed by approximately ±2% which is insignificant.

Some simulations are now discussed with reference to DD-DDQ pad designs.

Simulations were performed with 200 mm displacement between primary and secondary pads in the X direction.

The X and Y directions are marked FIG. 10. Bars 18 comprise ferrite used to create a high permeability "core" to provide a return path through the pad for coupling flux.

A high performing leakage element design which provided good leakage reduction in both the X and Y axes (using the notation described with reference to FIG. 6) had the dimensions:

OLx=250, ILx=100, OLy=200 and ILy=200. The leakage element was placed on the primary side. The flux readings along the center of the secondary pad in both the X and Y axes are shown in FIG. 10a.

The flux leakages at 800 mm from the center of the secondary pad with this design can are summarised in Table 5.

TABLE 5

|        | No FM    | With FM  | % Decrease |
|--------|----------|----------|------------|
| X Axis | 28.85 uT | 24.1 uT  | 16.45%     |
| Y Axis | 13.2 uT  | 11.7 uT  | 11.71%     |

The leakage element 10 was also cut up into smaller pieces similar to what was done with the pad described in FIG. 8. FIGS. 11A and 11B show how the surround was cut into four pieces (FM4, FIG. 11A); and two pieces (FM2, FIG. 11B).

The flux leakages at 800 mm from the center of the secondary pad with the FM2 and FM4 designs can are summarised in Table 6.

TABLE 6

|        | No FM    | FM4     | % Decrease | FM2     | % Decrease |
|--------|----------|---------|------------|---------|------------|
| X Axis | 28.85 uT | 24.5 uT | 15.0%      | 24.4 uT | 24.4%      |
| Y Axis | 13.2 uT  | 11.8 uT | 11.2%      | 13.2 uT | 0.56%      |

In a further simulation, the pads were aligned to be displaced by 200 mm in only the X direction.

These simulations were produced so that real measurements can be taken to validate the simulation results.

Three simulations were produced using the optimal results from the previous tests. The three systems are shown below in FIGS. 12A to 12C.

The FM 1L (FIG. 12A) design used two pieces of leakage element material which are 875 mm×235 mm sized. The width was chosen to be 235 mm. In the FM 2L (FIG. 12B) design, the width of the pieces has been halved and two layers of the leakage element material have been used. In the FM 3L (FIG. 12C) design, the width of the pieces is a third of those in the FM 1L design and 3 layers of the element material are used. The total area of FINEMET used in all these designs is the same (0.41 square meters).

The flux leakages at 800 mm from the center of the secondary pad with the FM 1 L, FM 2L and FM 3L designs can are summarised in Table 7.

TABLE 7

|        | No FM   | FM 1L   | % Decrease | FM 2L   | % Decrease | FM 3L   | % Decrease |
|--------|---------|---------|------------|---------|------------|---------|------------|
| X Axis | 92.7 uT | 50.7 uT | 45.4%      | 53.5 uT | 42.3%      | 5.45 uT | 41.2%      |
| Y Axis | 87.4 uT | 8.76 uT | -0.31%     | 9.02 uT | -3.21%     | 9.06 uT | -3.74%     |

The flux leakage has decreased considerably as seen in the above table. The flux lines in the X-direction can be seen in FIGS. 12d and 12e.

It is proposed that leakage elements can also be put onto the sills of a vehicle for example to try to reduce leakage flux. This concept was approximately simulated. Two 1500 mm×100 mm strips are put on the edges of a vehicle (the vehicle is assumed to be 1500 mm wide). This is shown in FIG. 13.

The simulation was run with one and two layers of leakage element material on the sills with no leakage element present on the primary side. The results are summarised in Table 8.

TABLE 8

|        | No FM    | 1 Layer sills | % Decrease | 2 Layer sills | % Decrease |
|--------|----------|---------------|------------|---------------|------------|
| X Axis | 28.85 uT | 28.8 uT       | 0.09%      | 24.9 uT       | 13.63%     |
| Y Axis | 13.2 uT  | 13.3 uT       | -0.21%     | 13.4 uT       | -0.73%     |

From the foregoing it will be seen that structures and materials are described which may be used to control or absorb electromagnetic fields generally, and/or which control or absorb unwanted magnetic fields in wireless power transfer applications.

The invention claimed is:

1. A magnetic flux coupling apparatus comprising:
   a coil for generating or receiving magnetic coupling flux; and
   a leakage flux element separated from the coil by a region of relatively low magnetic permeability and positioned to provide a controlled path for leakage flux independent of coupling flux;
   wherein the leakage flux element is configured to provide a path to return leakage flux to the coil and comprises a lossy magnetic material of relatively higher magnetic permeability than the coil; and
   wherein the lossy magnetic material absorbs energy from a time varying magnetic field to thereby attenuate leakage flux.

2. The magnetic flux coupling as claimed in claim 1 wherein the region of relatively low magnetic permeability comprises a space between the coil and the leakage flux element.

3. The magnetic flux coupling as claimed in claim 1 wherein the leakage element is constructed or positioned to substantially prevent magnetic saturation in use.

4. The magnetic flux coupling as claimed in claim 1 wherein the leakage flux element comprises a plurality of discrete pieces of material having a relatively high magnetic permeability.

5. The magnetic flux coupling as claimed in claim 4 wherein the pieces of material may be joined together, or may be placed adjacent to each other.

6. The magnetic flux coupling as claimed in claim 1 wherein the leakage flux element substantially surrounds a perimeter of the coil.

7. The magnetic flux element as claimed in claim 1 wherein the leakage flux element is substantially only on two sides of the coil.

8. The magnetic flux coupling as claimed in claim 1 wherein the magnetic flux coupling apparatus includes a magnetically permeable member which is magnetically associated with the coil to facilitate generating or receiving coupling flux.

9. The magnetic flux coupling as claimed in claim 1 wherein the leakage flux element may be formed of a material having hysteresis so that magnetic flux in the leakage flux element loses energy.

10. The magnetic flux coupling as claimed in claim 1 wherein the material has at least one of a high coercivity and high retentivity.

11. The magnetic flux coupling apparatus as claimed in claim 1 wherein the leakage flux element may extend between regions where leakage flux occurs and/or can be arranged to intercept leakage paths for flux in the environment in which the apparatus is located.

12. The magnetic flux coupling apparatus as claimed in claim 1 wherein the leakage flux element is relatively non-conductive.

13. The magnetic flux coupling as claimed in claim 1 wherein the leakage flux element is flexible.

14. A magnetic flux coupling apparatus as claimed in claim 1 wherein the leakage flux element comprises:
    a high permeability magnetic material arranged in a first layer; and
    a conductive or low permeability material arranged in a second layer.

15. A magnetic flux coupling apparatus as claimed in claim 14 wherein the leakage flux element further comprises:
    a high permeability magnetic material arranged in a third layer; and
    wherein the conductive or low permeability layer is arranged is an intermediate layer between the first and third layers.

16. A magnetic flux coupling apparatus as claimed in claim 14 wherein at least one of the first or second high permeability layers absorb energy from a time varying magnetic field.

17. A magnetic flux coupling apparatus as claimed in claim 14 wherein the first and second high permeability layers have different permeability.

18. A magnetic flux coupling apparatus as claimed in claim 14 at least one of the high permeability layers have a volume or thickness sufficient to prevent the layer becoming magnetically saturated in use.

19. A magnetic flux coupling apparatus as claimed in claim 14 wherein the low permeability layer has a thickness less than the order of the skin depth for a required absorption frequency.

20. A magnetic flux coupling apparatus as claimed in claim 14 wherein the one or more of the high permeability layers comprise multiple component-layers of high permeability material separated by non-metallic, non-magnetic material.

21. A magnetic flux coupling apparatus as claimed in claim 20 wherein the number of component-layers is adapted to prevent magnetic saturation for a given flux.

22. A magnetic flux coupling apparatus as claimed in claim 20 wherein the number of component-layers is adapted such that at least one of the high-permeability layers provide a required attenuation for magnetic flux.

23. TA magnetic flux coupling apparatus as claimed in claim 14 wherein any one or more of the layers comprises a tortuous path to facilitate energy dissipation.

24. A magnetic flux coupling apparatus as claimed in claim 14 wherein materials in consecutive layers have large differences in their relative conductances and reluctances so as to contain electrical or magnetic fields in respective layers.

25. A magnetic flux coupling apparatus as claimed in claim 14 further comprising a plurality of layers of a ferrimagnetic or ferromagnetic material alternated with a plurality of layers of conductive or low permeability material.

* * * * *